US012598200B2

(12) United States Patent
Peng et al.

(10) Patent No.: US 12,598,200 B2
(45) Date of Patent: Apr. 7, 2026

(54) DETECTING ABNORMAL PACKET TRAFFIC USING FINGERPRINTS FOR PLURAL PROTOCOL TYPES

(71) Applicant: Tencent Technology (Shenzhen) Company Limited, Shenzhen (CN)

(72) Inventors: Jing Peng, Shenzhen (CN); Yong Yang, Shenzhen (CN); Xiang Gan, Shenzhen (CN); Xing Zheng, Shenzhen (CN); Aisi Xu, Shenzhen (CN); Shanshan Hua, Shenzhen (CN); Jing Guo, Shenzhen (CN); You Chang, Shenzhen (CN); Yuhe Fan, Shenzhen (CN); Wentao Tang, Shenzhen (CN); Junli Shen, Shenzhen (CN); Shu He, Shenzhen (CN); Yue Wang, Shenzhen (CN); Yu Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 637 days.

(21) Appl. No.: 17/994,944

(22) Filed: Nov. 28, 2022

(65) Prior Publication Data

US 2023/0089187 A1    Mar. 23, 2023

Related U.S. Application Data

(63) Continuation of application No. PCT/CN2021/117975, filed on Sep. 13, 2021.

(30) Foreign Application Priority Data

Oct. 22, 2020    (CN) .......................... 202011136505.2

(51) Int. Cl.
    *H04L 9/40*                (2022.01)

(52) U.S. Cl.
    CPC ...... *H04L 63/1425* (2013.01); *H04L 63/0236* (2013.01); *H04L 63/20* (2013.01)

(58) Field of Classification Search
    CPC . H04L 63/1425; H04L 63/0236; H04L 63/20; H04L 63/1416
    See application file for complete search history.

(56) References Cited

U.S. PATENT DOCUMENTS 8,209,756 B1 *   6/2012   Guruswamy ........... H04L 63/12
                                                            713/188
10,038,715 B1 *   7/2018   Majkowski ......... H04L 63/1458
                    (Continued)

FOREIGN PATENT DOCUMENTS

CN        106559261 A      4/2017
CN        106790050 A      5/2017
                    (Continued)

OTHER PUBLICATIONS

Anderson B, McGrew D. OS fingerprinting: New techniques and a study of information gain and obfuscation. In2017 IEEE Conference on Communications and Network Security (CNS) Oct. 9, 2017 (pp. 1-9). IEEE. (Year: 2017).*
                    (Continued)

*Primary Examiner* — Lynn D Feild
*Assistant Examiner* — Ethan V Vo
(74) *Attorney, Agent, or Firm* — ARENTFOX SCHIFF LLP

(57)                ABSTRACT

A method for detecting abnormal network data includes performing feature extraction on a network data packet according to each of plural protocol types, and generating a corresponding data packet fingerprint set. The data packet fingerprint set includes one or more data packet fingerprints, each of the one or more data packet fingerprints corresponding to one of the plural protocol types. The method further
                    (Continued)

includes matching at least one data packet fingerprint in the data packet fingerprint set and a reference data packet fingerprint in a reference data packet fingerprint library, and calculating a confidence corresponding to the network data packet based on confidence correlation information corresponding to each of the at least one matched data packet fingerprint. The method also includes obtaining a reference confidence, and determining an abnormality detection result of the network data packet based on the reference confidence and the calculated confidence.

19 Claims, 9 Drawing Sheets

(56)                References Cited

U.S. PATENT DOCUMENTS

| 10,587,632 B1 * | 3/2020 | Perumalla ................ G06N 3/08 |
| 10,778,699 B1 * | 9/2020 | Bradley .............. H04L 63/1441 |
| 2009/0290764 A1 | 11/2009 | Fiebrink et al. |
| 2016/0352765 A1 | 12/2016 | Mermoud et al. |
| 2017/0134413 A1 * | 5/2017 | Kim ...................... H04L 43/026 |
| 2017/0244736 A1 * | 8/2017 | Benishti .............. H04L 63/1441 |
| 2017/0289180 A1 * | 10/2017 | Zheng ................. H04L 63/1416 |
| 2019/0141061 A1 * | 5/2019 | Krishtal ............... H04L 63/101 |
| 2020/0162507 A1 * | 5/2020 | Dudouit ............... H04L 63/108 |
| 2021/0185059 A1 * | 6/2021 | Achleitner ........... G06F 16/355 |
| 2022/0263823 A1 * | 8/2022 | Li ....................... H04L 63/1458 |

FOREIGN PATENT DOCUMENTS

| CN | 108200015 A | 6/2018 |
| CN | 108650218 A | 10/2018 |
| CN | 108833437 A | 11/2018 |
| CN | 111181923 A | 5/2020 |
| CN | 111291070 A | 6/2020 |
| CN | 112019574 A | 12/2020 |

OTHER PUBLICATIONS

First Office Action issued in CN202011136505.2, mailed Dec. 10, 2020, 15 pages.
International Search Report and Written Opinion in PCT/CN2021/117975, mailed Nov. 2, 2021, 11 pages.

* cited by examiner

S502

Obtain a target protocol confidence corresponding to the target protocol type

S504

Obtain a corresponding target algorithm confidence based on a fingerprint generation algorithm corresponding to the successfully matched target data packet fingerprint

S506

Obtain the target confidence based on the target protocol confidence and the target algorithm confidence

Sort target algorithm confidences corresponding to a same-layer protocol type in a descending order, to obtain a sorting result corresponding to each layer protocol type

S604

Obtain a first confidence corresponding to each layer protocol type according to target algorithm confidences sorted first and sorted second in the sorting result corresponding to the same-layer protocol type

S606

Sort remaining target algorithm confidences in the sorting result corresponding to the same-layer protocol type and the first confidence corresponding to the same-layer protocol type in the descending order, to obtain an updated sorting result corresponding to each layer protocol type; return to the operation of obtaining a first confidence corresponding to each layer protocol type according to target algorithm confidences sorted first and sorted second in the sorting result corresponding to the same-layer protocol type, until the target algorithm confidences corresponding to the same-layer protocol type each participate in data processing; and obtain a second confidence corresponding to each layer protocol type

S608

Obtain an intermediate confidence corresponding to each layer protocol type based on the target protocol confidence and the second confidence corresponding to the same-layer protocol type, and obtain the target confidence according to the intermediate confidences

FIG. 6

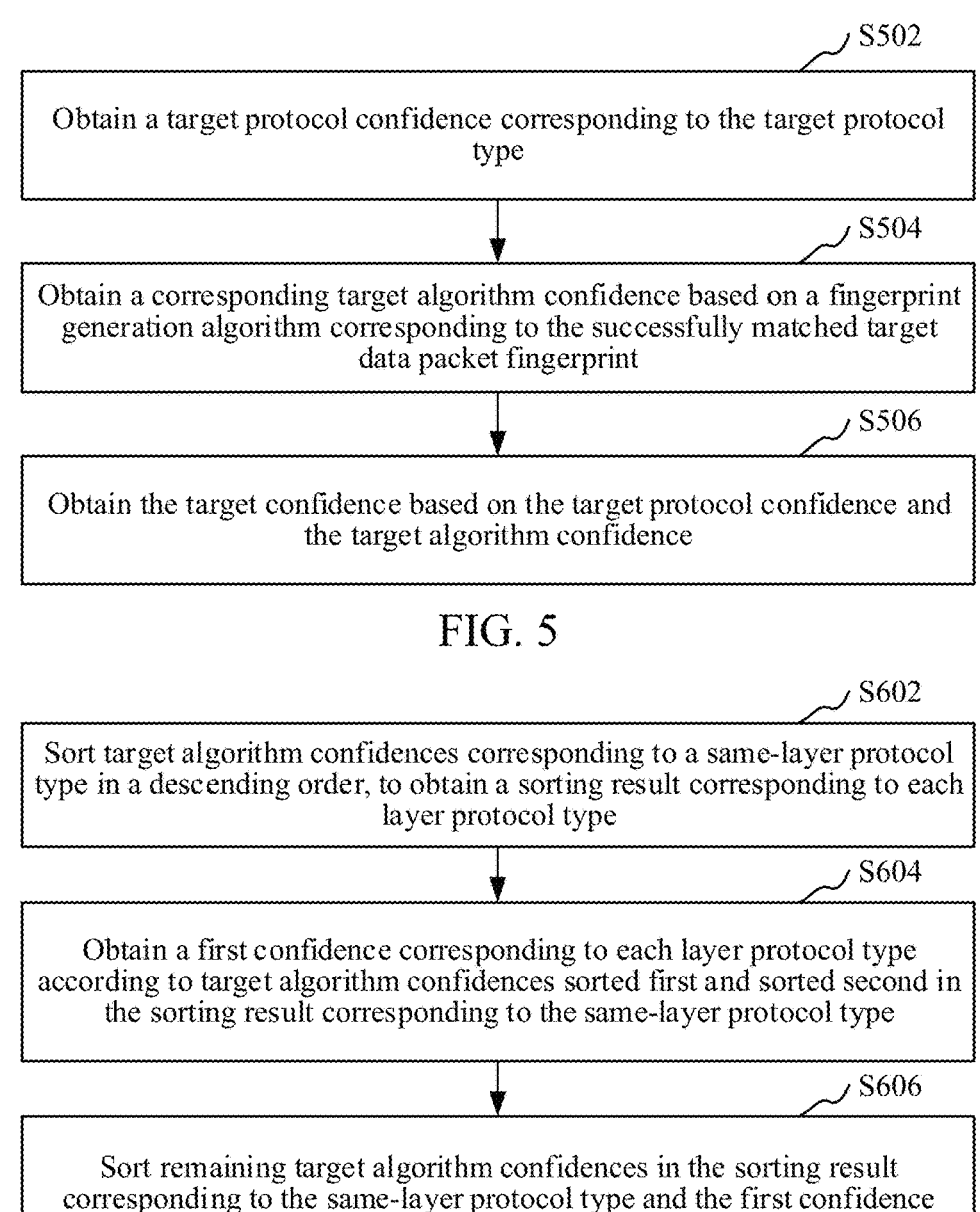

Count traffic in a time window → Generate data packet fingerprints → Clustering analysis Threshold filtering → Establish a second dialing black library Real-time traffic → Generate data packet fingerprints Data packet fingerprint matching Calculate a target confidence Threshold determination → Abnormality detection result

DETECTING ABNORMAL PACKET TRAFFIC USING FINGERPRINTS FOR PLURAL PROTOCOL TYPES

RELATED APPLICATIONS

This application is a continuation of International Application No. PCT/CN2021/117975, entitled "ABNORMAL NETWORK DATA DETECTION METHOD AND APPARATUS, COMPUTER DEVICE, AND STORAGE MEDIUM," and filed on Sep. 13, 2021, which claims priority to Chinese Patent Application No. 202011136505.2, entitled "METHOD AND APPARATUS FOR DETECTING ABNORMAL NETWORK DATA, COMPUTER DEVICE, AND STORAGE MEDIUM" filed on Oct. 22, 2020. The entire disclosures of the prior applications are hereby incorporated by reference.

FIELD OF THE TECHNOLOGY

This application relates to the field of computer technologies, including a method and apparatus for detecting abnormal network data, a computer device, and a storage medium.

BACKGROUND OF THE DISCLOSURE

The rapid development of computer technologies has brought great convenience to the propagation of information. However, at the same time, people are also faced with huge information security challenges, and information security problems have become increasingly prominent. For example, hackers can launch attacks on the network to steal confidential information on the network.

In the conventional technology, the detection of a network attack event is mainly to collect public blacklist IPs. If an IP of a current network data packet is detected as a public blacklist IP, it is determined that the network data packet is an abnormal network data packet and there is a network attack event. However, there are a very large quantity of IPs on the network, and the public blacklist IPs only include some of IPs used by hackers, which is prone to determination omissions, resulting in low detection accuracy of abnormal network data packets and low detection efficiency of the abnormal network data packets.

SUMMARY

According to various embodiments provided in this disclosure, a method and apparatus for detecting abnormal network data, a computer device, and a storage medium are provided.

In an embodiment, a method for detecting abnormal network data includes obtaining a network data packet, performing feature extraction on the network data packet according to each of plural protocol types corresponding to the network data packet, and generating a corresponding data packet fingerprint set. The data packet fingerprint set includes one or more data packet fingerprints of the network data packet, each of the one or more data packet fingerprints corresponding to one of the plural protocol types corresponding to the network data packet. The method further includes matching at least one data packet fingerprint in the data packet fingerprint set and a reference data packet fingerprint in a reference data packet fingerprint library, and calculating a confidence corresponding to the network data packet based on confidence correlation information corresponding to each of the at least one matched data packet fingerprint. The method further includes obtaining a reference confidence, and determining an abnormality detection result of the network data packet based on the reference confidence and the calculated confidence.

In an embodiment, an apparatus for detecting abnormal network data includes processing circuitry configured to obtain a network data packet, perform feature extraction on the network data packet according to each of plural protocol types corresponding to the network data packet, and generate a corresponding data packet fingerprint set. The data packet fingerprint set includes one or more data packet fingerprints of the network data packet, each of the one or more data packet fingerprints corresponding to one of the plural protocol types corresponding to the network data packet. The processing circuitry is further configured to match at least one data packet fingerprint in the data packet fingerprint set and a reference data packet fingerprint in a reference data packet fingerprint library, and calculate a confidence corresponding to the network data packet based on confidence correlation information corresponding to each of the at least one matched data packet fingerprint. The processing circuitry is further configured to obtain a reference confidence, and determine an abnormality detection result of the network data packet based on the reference confidence and the calculated confidence.

In an embodiment, a non-transitory computer-readable storage medium stores computer-readable instructions thereon, which, when executed by a computer device, cause the computer device to perform a method for detecting abnormal network data. The method for detecting abnormal network data includes obtaining a network data packet, performing feature extraction on the network data packet according to each of plural protocol types corresponding to the network data packet, and generating a corresponding data packet fingerprint set. The data packet fingerprint set includes one or more data packet fingerprints of the network data packet, each of the one or more data packet fingerprints corresponding to one of the plural protocol types corresponding to the network data packet. The method further includes matching at least one data packet fingerprint in the data packet fingerprint set and a reference data packet fingerprint in a reference data packet fingerprint library, and calculating a confidence corresponding to the network data packet based on confidence correlation information corresponding to each of the at least one matched data packet fingerprint. The method further includes obtaining a reference confidence, and determining an abnormality detection result of the network data packet based on the reference confidence and the calculated confidence.

Details of one or more embodiments of this disclosure are provided in the accompanying drawings and descriptions below. Other features, objectives, and advantages of this disclosure are illustrated in the specification, the accompanying drawings, and the claims.

BRIEF DESCRIPTION OF THE DRAWINGS

To describe the technical solutions in the embodiments of this disclosure more clearly, the following briefly describes accompanying drawings describing the embodiments. The accompanying drawings in the following description show merely some embodiments of this disclosure, and a person skilled in the art may still derive other drawings from these accompanying drawings.

FIG. 5 is a schematic flowchart of calculating a target confidence according to an embodiment.

FIG. 6 is a schematic flowchart of calculating a target confidence according to another embodiment.

DESCRIPTION OF EMBODIMENTS

To make objectives, technical solutions, and advantages of this disclosure clearer and more understandable, this disclosure is further described in detail below with reference to the accompanying drawings and the embodiments. It is to be understood that the specific embodiments described herein are only used for explaining this disclosure, and are not used for limiting this disclosure.

Cloud security is a collective name of security software, hardware, users, institutions, and security cloud platforms that are applied based on a cloud computing business mode. The cloud security integrates emerging technologies and concepts such as parallel processing, grid computing, and unknown virus behavior determination. Through the abnormality monitoring of a large quantity of mesh clients on software behaviors in a network, latest information of Trojan horses and malicious programs on the Internet is obtained and transmitted to a server for automatic analysis and processing, and then solutions of viruses and Trojan horses are distributed to each client.

Main research directions of the cloud security includes: 1. cloud computing security, which mainly researches how to ensure the security of a cloud itself and various applications on the cloud, including cloud computer system security, secure storage and isolation of user data, user access authentication, information transmission security, network attack protection, compliance audit, and the like; 2. cloudification of security infrastructure, which mainly researches how to use cloud computing to create and integrate security infrastructure resources and optimize security protection mechanisms, including: constructing ultra-large-scale security events and information acquisition and processing platforms through the cloud computing technology, implementing acquisition and correlation analysis of massive information, and improving a whole-network security incident control capability and a risk control capability; and 3. cloud security service, which mainly researches various security services provided to users based on cloud computing platforms, such as anti-virus services.

Figure 1:
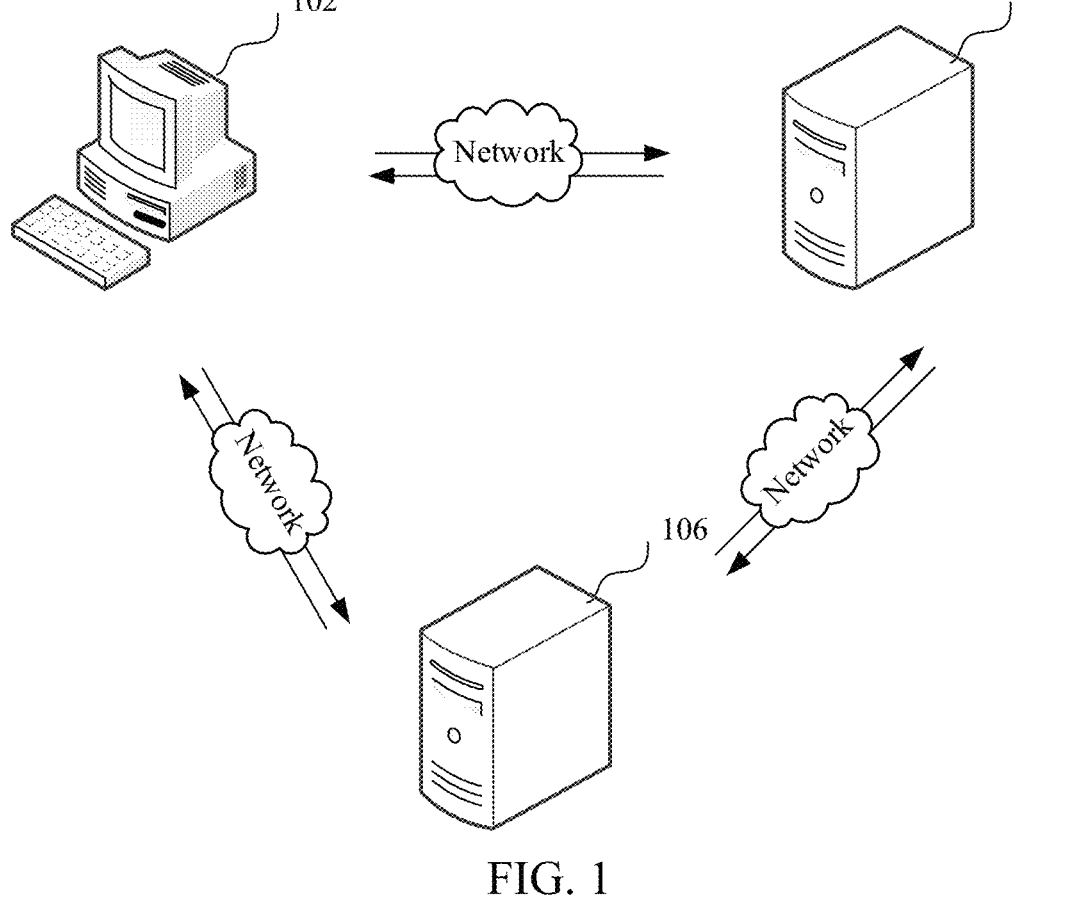
FIG. 1 is a diagram of an application environment of a method for detecting abnormal network data according to an embodiment.

A method for detecting abnormal network data provided in this disclosure is applicable to an application environment shown in FIG. 1. A terminal 102 communicates with a service server 104 through a network, the terminal 102 communicates with a detection server 106 through the network, and the service server 104 communicates with the detection server 106 through the network. The terminal 102 may communicate with the service server 104 by transmitting a network data packet. The detection server 106 may obtain a to-be-detected network data packet, perform feature extraction on the to-be-detected network data packet according to a target protocol type corresponding to the to-be-detected network data packet, and generate a corresponding target data packet fingerprint set, where the target data packet fingerprint set includes at least one target data packet fingerprint. The detection server 106 may match the target data packet fingerprint and a reference data packet fingerprint in a reference data packet fingerprint library, calculate a target confidence corresponding to the to-be-detected network data packet based on confidence correlation information corresponding to the successfully matched target data packet fingerprint, obtain a reference confidence, and determine an abnormality detection result of the to-be-detected network data packet based on the reference confidence and the target confidence.

The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. There may be more than one terminal. The terminal and the server may be directly or indirectly connected in a wired or wireless communication manner. This is not limited in this disclosure.

Figure 2:
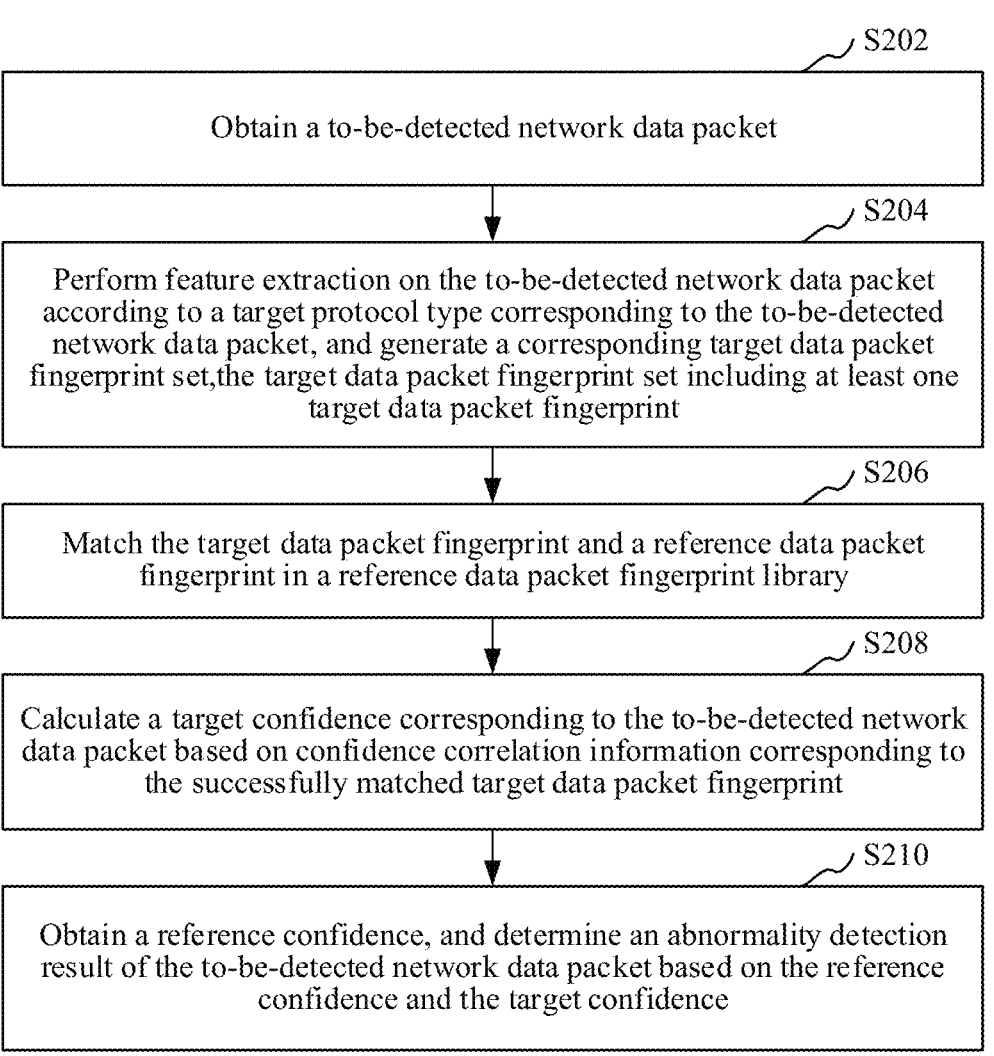
FIG. 2 is a schematic flowchart of a method for detecting abnormal network data according to an embodiment.

In an embodiment, as shown in FIG. 2, a method for detecting abnormal network data is provided. By using an example in which the method is applied to the detection server 106 in FIG. 1 for description, the method includes the following steps.

Step S202. Obtain a to-be-detected network data packet. For example, a network data packet is obtained.

The to-be-detected network data packet is a network data packet that is to be detected whether the network data packet is abnormal. The to-be-detected network data packet may be a network data packet obtained in real time, namely, real-time traffic. The network data packet is used for performing data transmission between a terminal and a service server. The network data packet may specifically include information such as a destination IP address, a source IP address, and net load data. The destination IP address is an address of a receiving party corresponding to the network data packet, the source IP address is an address of a transmitting party corresponding to the network data packet, and the net load data is specific request content or response content. For example, the terminal may transmit a network data packet requesting to open a news webpage to the service server, and the service server may return a network data packet corresponding to a current news webpage to the terminal. The request content includes at least one of text, a picture, or a video.

Specifically, the terminal may communicate with the service server by transmitting a network data packet. During communication, the detection server may obtain a current network data packet transmitted by the terminal or the service server as the to-be-detected network data packet.

In an embodiment, the terminal may communicate with the service server by transmitting a network data packet through a switch. The detection server may listen to the network data packet from the switch in a bypass mode.

Step S204. Perform feature extraction on the to-be-detected network data packet according to a target protocol type corresponding to the to-be-detected network data packet, and generate a corresponding target data packet fingerprint set, the target data packet fingerprint set including at least one target data packet fingerprint. For example, feature extraction is performed on the network data packet according to each of plural protocol types corresponding to the network data packet, and a corresponding data packet fingerprint set is generated. The data packet fingerprint set includes one or more data packet fingerprints of the network data packet, each of the one or more data packet fingerprints corresponding to one of the plural protocol types corresponding to the network data packet.

The target protocol type is a protocol type corresponding to the to-be-detected network data packet. The protocol type is a network protocol type transmitting the network data packet. The protocol type includes at least one of a current-layer protocol type or a related-layer protocol type. The current-layer protocol type is an application-layer protocol type corresponding to the network data packet, and the related-layer protocol type is an other-layer protocol type corresponding to the network data packet, and may specifically include at least one of a transmission-layer protocol type, a network-layer protocol type, or a data-link-layer protocol type corresponding to the network data packet. For example, if the network data packet is a network data packet of a hypertext transfer protocol (HTTP), a current-layer protocol type corresponding to the to-be-detected network data packet may be the HTTP. Because a transmission-layer protocol type corresponding to the HTTP is a transmission control protocol (TCP), the related-layer protocol type corresponding to the network data packet may be the TCP.

The target data packet fingerprint is a data packet fingerprint corresponding to the to-be-detected network data packet. The data packet fingerprint is corresponding feature information extracted from the network data packet according to the network protocol type, and is configured to identify the network data packet according to an identifier generated by the extracted feature information. One network data packet may correspond to at least one data packet fingerprint. One protocol type may generate at least one data packet fingerprint. For example, if protocol types corresponding to a network data packet include HTTP and TCP, at least one data packet fingerprint may be generated based on HTTP, and at least one data packet fingerprint may be generated based on TCP. Different data packet fingerprints corresponding to one network data packet may represent feature information of the network data packet from different dimensions. Different network data packets correspond to different data packet fingerprint sets, but different data packet fingerprint sets may include at least one different data packet fingerprint. For example, for a network data packet A and a network data packet B transmitted from a same terminal, because the network data packet A and the network data packet B correspond to a same transmitting party, the network data packet A and the network data packet B may have a same data packet fingerprint, and the same data packet fingerprint may be generated according to related information of the transmitting party in feature information.

Specifically, the detection server may obtain the target protocol type corresponding to the to-be-detected network data packet from the to-be-detected network data packet, extract feature information from the to-be-detected network data packet according to the target protocol type, and generate at least one corresponding target data packet fingerprint according to the extracted feature information, where the target data packet fingerprints form the target data packet fingerprint set. The detection server may perform feature extraction on the to-be-detected network data packet according to the current-layer protocol type corresponding to the to-be-detected network data packet, to generate the corresponding target data packet fingerprint set; may also perform feature extraction on the to-be-detected network data packet according to the related-layer protocol type corresponding to the to-be-detected network data packet, to generate the corresponding target data packet fingerprint set; and may also perform feature extraction on the to-be-detected network data packet according to the current-layer protocol type and the related-layer protocol type corresponding to the to-be-detected network data packet, to generate the corresponding target data packet fingerprint set.

In an embodiment, the detection server may obtain the current-layer protocol type corresponding to the to-be-detected network data packet from the to-be-detected network data packet, obtain a fingerprint generation algorithm corresponding to the current-layer protocol type from the local or another terminal or server, extract a feature field matching the fingerprint generation algorithm from the to-be-detected network data packet based on the fingerprint generation algorithm, and obtain a target data packet fingerprint generated by the fingerprint generation algorithm corresponding to the current-layer protocol type according to the extracted feature field. There may be at least one fingerprint generation algorithm corresponding to the current-layer protocol type. If there are a plurality of fingerprint generation algorithms corresponding to the current-layer protocol type, a plurality of target data packet fingerprints corresponding to the current-layer protocol type may be generated. Similarly, the detection server may obtain the related-layer protocol type corresponding to the to-be-detected network data packet from the to-be-detected network data packet, obtain a fingerprint generation algorithm corresponding to the related-layer protocol type from the local or another terminal or server, extract a feature field matching the fingerprint generation algorithm from the to-be-detected network data packet based on the fingerprint generation algorithm, and obtain a target data packet fingerprint generated by the fingerprint generation algorithm corresponding to the related-layer protocol type according to the extracted feature field. There may be at least one fingerprint generation algorithm corresponding to the related-layer protocol type. When there are a plurality of fingerprint generation algorithms corresponding to the related-layer protocol type, a plurality of target data packet fingerprints corresponding to the related-layer protocol type may be generated. The target data packet fingerprint set may be obtained by combining the target data packet fingerprints corresponding to the current-layer protocol type, the target data packet fingerprint set may also be obtained by combining the target data packet fingerprints corresponding to the related-layer protocol type, and the target data packet fingerprint set may also be obtained by combining the target data packet fingerprints corresponding to the current-layer protocol type and the target data packet fingerprints corresponding to the related-layer protocol type.

In an embodiment, a network data packet includes a plurality of fields, and different fields may represent different pieces of feature information of the network data packet. For example, the fields of the network data packet include the destination IP address, the source IP address, a protocol type, a transmitting time, a packet size, the net load data, and the like. Generation of a data packet fingerprint according to extracted feature fields may specifically refer to: arranging and combining the feature fields according to a field sequence specified in the fingerprint generation algorithm to obtain target feature information, and calculating a hash value of the target feature information to obtain the data packet fingerprint. It may be understood that, field positions of fields with a same type in network data packets corresponding to different protocol types may be the same or different, and the target feature information may further include field positions of the feature fields in the network data packet.

Figure 3:
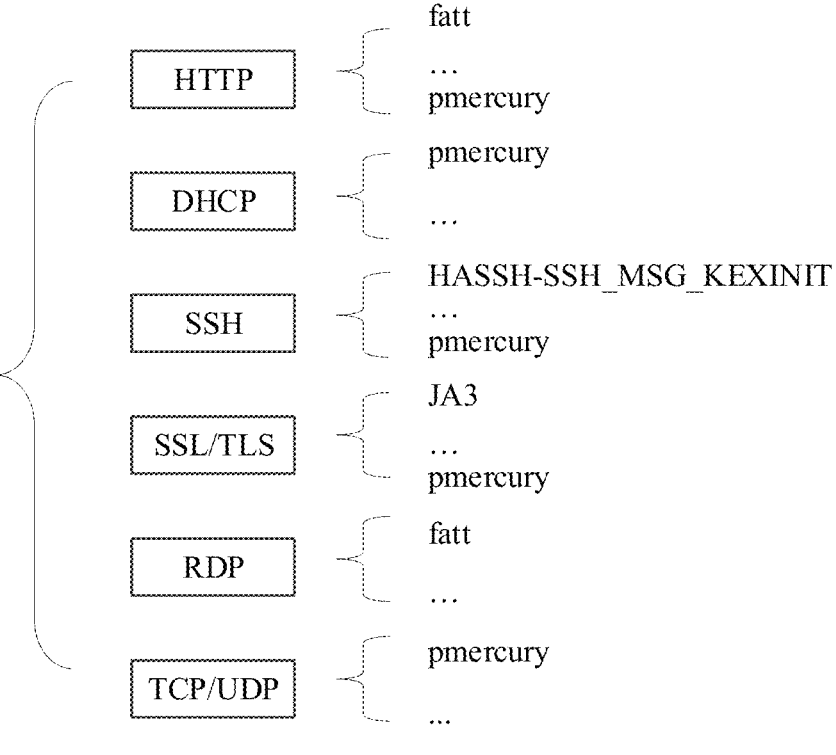
FIG. 3 is a schematic diagram of classifying data packet fingerprints according to an embodiment.

In an embodiment, if each protocol may respectively correspond to a plurality of fingerprint generation algorithms, data packet fingerprints may be classified according to the protocol types and the fingerprint generation algorithms. As shown in FIG. 3, network protocols include an HTTP, a dynamic host configuration protocol (DHCP), a secure shell (SSH) protocol, a secure sockets layer (SSL) protocol, a transport layer security (TLS) protocol, a remote display protocol (RDP), a TCP, and a user datagram protocol (UDP). The DHCP is transmitted based on the UDP, the SSH protocol is transmitted based on the TCP, the SSL/TLS protocol are transmitted based on the TCP, and the RDP is transmitted based on the TCP. Fingerprint generation algorithms corresponding to the HTTP may include fatt, pmercury, and the like. The fingerprint all the things (fatt) is a pyshark-based script for extracting data packet fingerprints from packet capture data (pcap) files and network data packets. pmercury is python implementation of mercury, and the mercury is a Linux application program for extracting data packet fingerprints from network data packets. Fingerprint generation algorithms corresponding to the DHCP may include pmercury and the like. Fingerprint generation algorithms corresponding to the SSH protocol may include HASSH-SSH_MSG_KEXINIT, pmercury, and the like. HASSH is an open source algorithm, SSH_MSG_KEXINIT is a key exchange data packet header, and HASSH-SSH_MSG_KEXINIT is a method for recognizing fingerprints of an SSH client. Fingerprint generation algorithms corresponding to the SSL protocol and the TLS protocol may include JA3, pmercury, and the like. JA3 is a method for online recognizing fingerprints of a TLS client. Fingerprint generation algorithms corresponding to the RDP may include fatt and the like. Fingerprint generation algorithms corresponding to the TCP and the UDP may include pmercury and the like. One fingerprint generation algorithm corresponding to one protocol is used as a type. In such classification, when data packet fingerprints are calculated, one network data packet may correspond to a plurality of protocols, and may also correspond to a plurality of fingerprint generation algorithms; and network data packets may be classified from different dimensions during classification, so that the determination is more accurate. For example, for the HTTP, because the HTTP is based on the TCP, data packet fingerprints corresponding to one HTTP network data packet may include a data packet fingerprint generated by the fingerprint generation algorithm pmercury corresponding to the TCP, a data packet fingerprint generated by the fingerprint generation algorithm pmercury corresponding to the HTTP, and a data packet fingerprint generated by the fingerprint generation algorithm fatt corresponding to the HTTP. Feature fields extracted by different fingerprint generation algorithms from a network data packet may be the same or different. For a same network data packet, data packet fingerprints generated by a same fingerprint generation algorithm corresponding to different protocols are different. That is because, for different protocols, feature fields extracted by the same fingerprint generation algorithm from the network data packet are different. For example, for the HTTP and the TCP, feature fields extracted by the fingerprint generation algorithm pmercury from the network data packet are different.

Step S206. Match the target data packet fingerprint and a reference data packet fingerprint in a reference data packet fingerprint library. For example, at least one data packet fingerprint in the data packet fingerprint set is matched with a reference data packet fingerprint in a reference data packet fingerprint library.

The reference data packet fingerprint library includes a plurality of reference data packet fingerprints. The reference data packet fingerprint library is generated by performing a clustering analysis on data packet fingerprints corresponding to a plurality of candidate network data packets. The candidate network data packets are network data packets in a set historical time period, for example, network data packets acquired in five minutes before a current moment are obtained as the candidate network data packets. The length of the historical time period may be determined according to actual situations. This is not limited in this embodiment of the present disclosure. It may be understood that, an attack behavior of a hacker is a continuous and common attack behavior. For example, the hacker mainly launches attacks from a same terminal, the hacker mainly launches attacks from a same browser, and the hacker mainly launches attacks from a same account. Therefore, during a clustering analysis, if a quantity of same data packet fingerprints is greater than a threshold, the data packet fingerprints may be considered as abnormal data packet fingerprints, and the data packet fingerprints are added to the reference data packet fingerprint library as the reference data packet fingerprints.

Specifically, after the target data packet fingerprint corresponding to the to-be-detected network data packet is calculated, the detection server may match the target data packet fingerprint and the reference data packet fingerprint in the reference data packet fingerprint library, and further determine an abnormality detection result of the to-be-detected network data packet according to a matching result. When the target data packet fingerprint is the same as the reference data packet fingerprint and fingerprint correlation information corresponding to the target data packet fingerprint is also the same as fingerprint correlation information corresponding to the reference data packet fingerprint, it may be determined that the target data packet fingerprint successfully matches the reference data packet fingerprint. Fingerprint correlation information includes at least one of a protocol type or a fingerprint generation algorithm corresponding to a data packet fingerprint. It may be understood that, one to-be-detected network data packet may correspond to a plurality of target data packet fingerprints, and the target data packet fingerprints may respectively match the reference data packet fingerprints in the reference data packet fingerprint library. The target data packet fingerprints may all successfully match, or may all fail to match, or may be that at least one target data packet fingerprint successfully matches.

In an embodiment, the reference data packet fingerprint library may be generated by the detection server, or may be generated by another terminal or server and transmitted to the detection server.

Step S208. Calculate a target confidence corresponding to the to-be-detected network data packet based on confidence correlation information corresponding to the successfully matched target data packet fingerprint. For example, a confidence corresponding to the network data packet is calculated based on confidence correlation information corresponding to each of the at least one matched data packet fingerprint.

Confidence correlation information is correlation information used for calculating a confidence corresponding to a network data packet. Confidence correlation information of a data packet fingerprint includes at least one of a protocol confidence of a protocol type corresponding to the data packet fingerprint or an algorithm confidence of a fingerprint generation algorithm corresponding to the data packet fingerprint under the protocol type. For example, if the successfully matched target data packet fingerprint is a data packet fingerprint generated by a fingerprint generation algorithm 1 corresponding to the HTTP, the confidence correlation information corresponding to the target data packet fingerprint includes a protocol confidence corresponding to the HTTP and an algorithm confidence corresponding to the fingerprint generation algorithm 1 under the HTTP. The protocol confidence and the algorithm confidence may be determined according to actual situations, for example, be manually set according to safety experience, or be calculated according to a customized formula. Algorithm confidences corresponding to a same fingerprint generation algorithm under different protocols may be the same or different. The target confidence is used for determining an abnormality degree of a network data packet. A greater target confidence indicates a greater abnormality degree of the network data packet.

Specifically, the detection server may screen the successfully matched target data packet fingerprint according to the matching result, obtain the confidence correlation information corresponding to the successfully matched target data packet fingerprint, and calculate the target confidence corresponding to the to-be-detected network data packet according to the confidence correlation information.

In an embodiment, the detection server may perform weighted summation on protocol confidences and algorithm confidences corresponding to the successfully matched target data packet fingerprints to obtain the target confidence. The detection server may also perform weighted multiplication on the protocol confidences and the algorithm confidences to obtain the target confidence. When the successfully matched target data packet fingerprints include target data packet fingerprints corresponding to different protocol types, intermediate confidences corresponding to the protocol types may be first calculated respectively, and then weighted summation is performed on the intermediate confidences to obtain the target confidence. When the intermediate confidences corresponding to the protocol types are calculated, weighted summation may be performed on algorithm confidences corresponding to a same protocol type to obtain an algorithm confidence statistical value, and weighted multiplication is performed on the algorithm confidence statistical value and the corresponding protocol confidence to obtain the corresponding intermediate confidence. Alternatively, the intermediate confidences corresponding to the protocol types may also be respectively used as the target confidence corresponding to the to-be-detected network data packet.

Step S210. Obtain a reference confidence, and determine an abnormality detection result of the to-be-detected network data packet based on the reference confidence and the target confidence. For example, a reference confidence is obtained, and an abnormality detection result of the network data packet is determined based on the reference confidence and the calculated confidence.

The reference confidence may be determined according to actual situations, for example, be manually set according to safety experience, or be calculated according to a customized formula.

Specifically, the detection server may obtain the reference confidence, compare the reference confidence and the target confidence, and determine the abnormality detection result of the to-be-detected network data packet according to a comparison result. The abnormality detection result includes the network data packet being abnormal and the network data packet being normal. When the abnormality detection result of the to-be-detected network data packet is that the network data packet is abnormal, the detection server may transmit alarm information to operation and maintenance personnel, so that the operation and maintenance personnel can perform security maintenance in time. When the abnormality detection result of the to-be-detected network data packet is that the network data packet is abnormal, the detection server may also directly block the to-be-detected network data packet, to prevent a hacker from attacking.

In an embodiment, all to-be-detected network data packets may use a same reference confidence, that is, there is only one reference confidence. Alternatively, one protocol type may correspond to one reference confidence. For example, if protocol types corresponding to the successfully matched target data packet fingerprints include the HTTP and the TCP, the HTTP corresponds to a reference confidence 1, and the TCP corresponds to a reference confidence 2, when a confidence statistical value calculated based on confidence correlation information of a target data packet fingerprint corresponding to the HTTP is greater than the reference confidence 1 and a confidence statistical value calculated based on confidence correlation information of a target data packet fingerprint corresponding to the TCP is greater than the reference confidence 2, it is determined that the abnormality detection result of the to-be-detected network data packet is that the network data packet is abnormal.

In the above method for detecting abnormal network data, a to-be-detected network data packet is obtained, feature extraction is performed on the to-be-detected network data packet according to a target protocol type corresponding to the to-be-detected network data packet, and a corresponding target data packet fingerprint set is generated, where the target data packet fingerprint set includes at least one target data packet fingerprint. In this way, the generated target data packet fingerprint can represent feature information of the to-be-detected network data packet, and a plurality of target data packet fingerprints can represent the feature information of the to-be-detected network data packet from different dimensions, thereby enriching the detection dimensions of an abnormal network data packet, and improving the detection accuracy of the abnormal network data packet. The target data packet fingerprint and a reference data packet fingerprint in a reference data packet fingerprint library are matched, a target confidence corresponding to the to-be-detected network data packet is calculated based on confidence correlation information corresponding to the success-fully matched target data packet fingerprint, a reference confidence is obtained, and an abnormality detection result of the to-be-detected network data packet is determined based on the reference confidence and the target confidence. In this way, the reference data packet fingerprint library integrates a plurality of abnormal reference data packet fingerprints. Therefore, the successfully matched target data packet fingerprint can represent feature information that the to-be-detected network data packet is abnormal, the target confidence calculated based on the confidence correlation information corresponding to the successfully matched target data packet fingerprint can represent an abnormality degree of the to-be-detected network data packet, and the abnormality detection result of the to-be-detected network data packet can be rapidly determined based on the reference confidence and the target confidence, thereby improving the detection accuracy and the detection efficiency of the abnormal network data packet.

Figure 4:
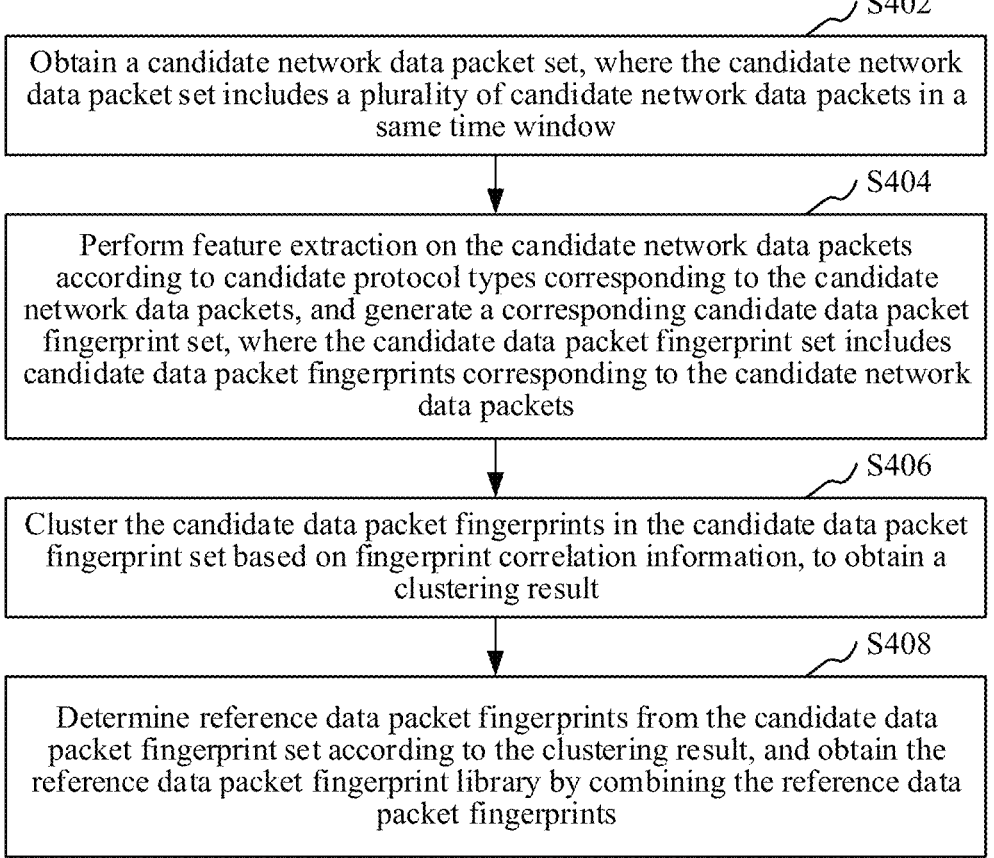
FIG. 4 is a schematic flowchart of establishing a reference data packet fingerprint library according to an embodiment.

In an embodiment, as shown in FIG. 4, before the obtaining a to-be-detected network data packet, the method further includes the following steps:

Step S402. Obtain a candidate network data packet set, where the candidate network data packet set includes a plurality of candidate network data packets in a same time window.

Step S404. Perform feature extraction on the candidate network data packets according to candidate protocol types corresponding to the candidate network data packets, and generate a corresponding candidate data packet fingerprint set, where the candidate data packet fingerprint set includes candidate data packet fingerprints corresponding to the candidate network data packets.

Specifically, the detection server may obtain a plurality of candidate network data packets in a time window to form the candidate network data packet set. The detection server may perform feature extraction on the candidate network data packets according to the candidate protocol types corresponding to the candidate network data packets, and generate at least one candidate data packet fingerprint respectively corresponding to the candidate network data packets, where the candidate data packet fingerprints corresponding to the candidate network data packets form the candidate data packet fingerprint set. The length of the time window may be set according to needs, for example, be set to five minutes. The detection server obtains network data packets acquired in five minutes before a current moment as the candidate network data packets, and combines the candidate network data packets to form the candidate network data packet set.

In an embodiment, the detection server may obtain a current-layer protocol type corresponding to a candidate network data packet from the candidate network data packet, obtain a fingerprint generation algorithm corresponding to the current-layer protocol type from the local or another terminal or server, extract a feature field matching the fingerprint generation algorithm from the candidate network data packet based on the fingerprint generation algorithm, and obtain a candidate data packet fingerprint generated by the fingerprint generation algorithm corresponding to the current-layer protocol type according to the extracted feature field. There may be at least one fingerprint generation algorithm corresponding to the current-layer protocol type. If there are a plurality of fingerprint generation algorithms corresponding to the current-layer protocol type, a plurality of candidate data packet fingerprints corresponding to the current-layer protocol type may be generated. Similarly, the detection server may obtain a related-layer protocol type corresponding to the candidate network data packet from the candidate network data packet, obtain a fingerprint generation algorithm corresponding to the related-layer protocol type from the local or another terminal or server, extract a feature field matching the fingerprint generation algorithm from the candidate network data packet based on the fingerprint generation algorithm, and obtain a candidate data packet fingerprint generated by the fingerprint generation algorithm corresponding to the related-layer protocol type according to the extracted feature field. There may be at least one fingerprint generation algorithm corresponding to the related-layer protocol type. When there are a plurality of fingerprint generation algorithms corresponding to the related-layer protocol type, a plurality of candidate data packet fingerprints corresponding to the related-layer protocol type may be generated. The candidate data packet fingerprint set may be obtained by combining candidate data packet fingerprints corresponding to current-layer protocol types of the candidate network data packets, the candidate data packet fingerprint set may also be obtained by combining candidate data packet fingerprints corresponding to related-layer protocol types of the candidate network data packets, and the candidate data packet fingerprint set may also be obtained by combining the candidate data packet fingerprints corresponding to the current-layer protocol types of the candidate network data packets and the candidate data packet fingerprints corresponding to the related-layer protocol types of the candidate network data packets.

Step S406. Cluster the candidate data packet fingerprints in the candidate data packet fingerprint set based on fingerprint correlation information, to obtain a clustering result.

Fingerprint correlation information is correlation information of a data packet fingerprint. The fingerprint correlation information of the data packet fingerprint includes a protocol type and a fingerprint generation algorithm used for generating the data packet fingerprint.

Specifically, the detection server may cluster the candidate data packet fingerprints in the candidate data packet fingerprint set based on the fingerprint correlation information, which may specifically refer to: clustering same candidate data packet fingerprints generated based on same fingerprint correlation information, to obtain a plurality of different clusters.

In an embodiment, the clustering the candidate data packet fingerprints in the candidate data packet fingerprint set based on fingerprint correlation information, to obtain a clustering result includes: clustering same candidate data packet fingerprints generated based on a same fingerprint generation algorithm corresponding to a same protocol type, to obtain a plurality of different clusters, and counting a quantity of candidate data packet fingerprints in a same cluster, to obtain statistical values corresponding to the clusters.

Specifically, the detection server may cluster the same candidate data packet fingerprints generated based on the same fingerprint generation algorithm corresponding to the same protocol type, to obtain the plurality of different clusters. One cluster represents candidate data packet fingerprints of one type. The detection server may count the quantity of candidate data packet fingerprints in the same cluster, to obtain the statistical values corresponding to the clusters. That is, the detection server may count a quantity of same candidate data packet fingerprints generated under a same protocol type and a same fingerprint generation algorithm in a time window, to obtain a plurality of statistical values. For example, a quantity of candidate data packet fingerprints a generated by the fingerprint generation algorithm 1 corresponding to the HTTP is counted, a quantity of candidate data packet fingerprints b generated by the fingerprint generation algorithm 2 corresponding to the HTTP is counted, a quantity of candidate data packet fingerprints c generated by a fingerprint generation algorithm 3 corresponding to the SSH protocol is counted, and a quantity of candidate data packet fingerprints d generated by the fingerprint generation algorithm 1 corresponding to the SSH protocol is counted.

Step S408. Determine reference data packet fingerprints from the candidate data packet fingerprint set according to the clustering result, and obtain the reference data packet fingerprint library by combining the reference data packet fingerprints.

Specifically, the detection server may determine the reference data packet fingerprints from the candidate data packet fingerprint set according to the clustering result, which may specifically refer to: when statistical values corresponding to clusters are greater than a statistical threshold, using candidate data packet fingerprints corresponding to the clusters as the reference data packet fingerprints, and obtaining the reference data packet fingerprint library by combining the reference data packet fingerprints. The reference data packet fingerprint library may further include fingerprint correlation information and statistical values corresponding to the reference data packet fingerprints.

In an embodiment, the determining reference data packet fingerprints from the candidate data packet fingerprint set according to the clustering result, and obtaining the reference data packet fingerprint library by combining the reference data packet fingerprints includes: using candidate data packet fingerprints of clusters whose statistical values are greater than a statistical threshold as the reference data packet fingerprints.

Specifically, when the statistical values corresponding to the clusters are greater than the statistical threshold, it indicates that the candidate data packet fingerprints in the clusters frequently occur in a same time window, which is more likely caused by attacks of a hacker. Therefore, the detection server may use the candidate data packet fingerprints in the clusters as the reference data packet fingerprints. The statistical threshold may be set according to a size of the time window. A greater time window indicates a greater statistical threshold.

In an embodiment, if the time window may dynamically change, the reference data packet fingerprint library may also be dynamically updated. For example, if the time window is always kept five minutes before the current time, the detection server may cluster candidate data packet fingerprints corresponding to candidate network data packets obtained in five minutes every five minutes, and update the reference data packet fingerprint library according to the clustering result.

It may be understood that, there may be a plurality of reference data packet fingerprints generated based on a same fingerprint generation algorithm corresponding to a same protocol type in the reference data packet fingerprint library. For example, the reference data packet fingerprint library includes a reference data packet fingerprint 1 generated based on the fingerprint generation algorithm fatt corresponding to the HTTP, a reference data packet fingerprint 2 generated based on the fingerprint generation algorithm fatt corresponding to the HTTP, and a reference data packet fingerprint 3 based on the fingerprint generation algorithm fatt corresponding to the HTTP.

In this embodiment, a plurality of candidate network data packets in a same time window are obtained, candidate data packet fingerprints corresponding to the candidate network data packets are calculated, a clustering analysis is performed on the candidate data packet fingerprints based on fingerprint correlation information to obtain clusters, statistical values corresponding to the clusters are calculated, candidate data packet fingerprints of clusters whose statistical values are greater than a statistical threshold are used as reference data packet fingerprints, and a reference data packet fingerprint library is obtained by combining the reference data packet fingerprints. In this way, because attacks of a hacker are usually continuous, the clustering analysis is performed on the candidate data packet fingerprints corresponding to the candidate network data packets in the same time window, and a data packet fingerprint black library can be rapidly established by comparing the statistical values corresponding to the clusters and the statistical threshold.

In an embodiment, the matching the target data packet fingerprint and a reference data packet fingerprint in a reference data packet fingerprint library includes: comparing the target data packet fingerprint and a current reference data packet fingerprint, to obtain a data packet fingerprint comparison result; comparing fingerprint correlation information corresponding to the target data packet fingerprint and fingerprint correlation information corresponding to the current reference data packet fingerprint, to obtain a fingerprint correlation information comparison result; and determining, in a case that the data packet fingerprint comparison result is consistent with the fingerprint correlation information comparison result, that the target data packet fingerprint successfully matches the current reference data packet fingerprint.

Specifically, when the target data packet fingerprint and the reference data packet fingerprint in the reference data packet fingerprint library are matched, the detection server may compare the target data packet fingerprint and the current reference data packet fingerprint, to obtain the data packet fingerprint comparison result, where the data packet fingerprint comparison result includes consistency and non-consistency; and compare the fingerprint correlation information corresponding to the target data packet fingerprint and the fingerprint correlation information corresponding to the current reference data packet fingerprint, to obtain the fingerprint correlation information comparison result, where the fingerprint correlation information comparison result includes consistency and non-consistency. When the data packet fingerprint comparison result is consistent with the fingerprint correlation information comparison result, the detection server may determine that the target data packet fingerprint successfully matches the current reference data packet fingerprint.

For example, when a target data packet fingerprint a is consistent with a current reference data packet fingerprint b, both a protocol type corresponding to the target data packet fingerprint a and a protocol type corresponding to the current reference data packet fingerprint b are the HTTP. When both a fingerprint generation algorithm corresponding to the target data packet fingerprint a and a fingerprint generation algorithm corresponding to the current reference data packet fingerprint b are pmercury, it is determined that the target data packet fingerprint a successfully matches the current reference data packet fingerprint b. It may be understood that, even though a network data packet A corresponding to the target data packet fingerprint a is not the same as a network data packet B corresponding to the current reference data packet fingerprint b, when the target data packet fingerprint a is consistent with the current reference data packet fingerprint b and the protocol types and the finger-print generation algorithms used for generating the target data packet fingerprint a and the current reference data packet fingerprint b are consistent, it indicates that the network data packet A and the network data packet B include same feature information, and are more likely two network data packets transmitted by a same hacker.

In this embodiment, a matching result of a target data packet fingerprint and a reference data packet fingerprint can be rapidly determined through a data packet fingerprint comparison result and a fingerprint correlation information comparison result, thereby helping improve the detection efficiency of a to-be-detected network data packet.

In an embodiment, as shown in FIG. 5, the calculating a target confidence corresponding to the to-be-detected net-work data packet based on confidence correlation informa-tion corresponding to the successfully matched target data packet fingerprint includes the following steps:

Step S502. Obtain a target protocol confidence corre-sponding to the target protocol type.

Step S504. Obtain a corresponding target algorithm con-fidence based on a fingerprint generation algorithm corre-sponding to the successfully matched target data packet fingerprint.

Step S506. Obtain the target confidence based on the target protocol confidence and the target algorithm confi-dence.

Specifically, the detection server may obtain the target protocol confidence corresponding to the target protocol type, obtain target algorithm confidences corresponding to fingerprint generation algorithms corresponding to the suc-cessfully matched target data packet fingerprints, and obtain the target confidence by merging the target protocol confi-dence and the target algorithm confidences. During merging, the detection server may multiply the target protocol con-fidence by the target algorithm confidences, to obtain the target confidence; or may first count the target algorithm confidences to obtain an algorithm confidence statistical value, and then merge the algorithm confidence statistical value and the target protocol confidence, to obtain the target confidence. The counting of the target algorithm confidences may specifically refer to: adding the target algorithm con-fidences to obtain the algorithm confidence statistical value, calculating an average value of the target algorithm confi-dences to obtain the algorithm confidence statistical value, or merging the target algorithm confidences according to a preset formula to obtain the algorithm confidence statistical value.

In this embodiment, a target protocol confidence corre-sponding to a target protocol type is obtained, a correspond-ing target algorithm confidence is obtained based on a fingerprint generation algorithm corresponding to a success-fully matched target data packet fingerprint, and the target confidence is obtained based on the target protocol confi-dence and the target algorithm confidence. In this way, the calculation of the target confidence comprehensively con-siders the target protocol type and the fingerprint generation algorithm corresponding to the successfully matched target data packet fingerprint, so that the calculated target confi-dence is more accurate and more reliable.

In an embodiment, as shown in FIG. 6, the target protocol type includes a current-layer protocol type and a related-layer protocol type, and the obtaining the target confidence based on the target protocol confidence and the target algorithm confidence includes the following steps:

Step S602. Sort target algorithm confidences correspond-ing to a same-layer protocol type in a descending order, to obtain a sorting result corresponding to each layer protocol type.

Step S604. Obtain a first confidence corresponding to each layer protocol type according to target algorithm con-fidences sorted first and sorted second in the sorting result corresponding to the same-layer protocol type.

Step S606. Sort remaining target algorithm confidences in the sorting result corresponding to the same-layer protocol type and the first confidence corresponding to the same-layer protocol type in the descending order, to obtain an updated sorting result corresponding to each layer protocol type; return to the operation of obtaining a first confidence cor-responding to each layer protocol type according to target algorithm confidences sorted first and sorted second in the sorting result corresponding to the same-layer protocol type, until the target algorithm confidences corresponding to the same-layer protocol type each participate in data processing; and obtain a second confidence corresponding to each layer protocol type.

Step S608. Obtain an intermediate confidence corre-sponding to each layer protocol type based on the target protocol confidence and the second confidence correspond-ing to the same-layer protocol type, and obtain the target confidence according to the intermediate confidences.

Specifically, the target protocol type includes the current-layer protocol type and the related-layer protocol type, and different layer protocol types need to be differentiated for calculation. The detection server may sort the target algo-rithm confidences corresponding to the same-layer protocol type in the descending order, to obtain the sorting result corresponding to each layer protocol type. The detection server obtains the target algorithm confidences sorted first and sorted second in the sorting result corresponding to the same-layer protocol type, and performs weighted summa-tion on the target algorithm confidences sorted first and sorted second corresponding to the same-layer protocol type, to obtain the first confidence corresponding to each layer protocol type. The detection server sorts the remaining target algorithm confidences in the sorting result corre-sponding to the same-layer protocol type and the first confidence corresponding to the same-layer protocol type in the descending order, to obtain the updated sorting result corresponding to each layer protocol type; obtains target algorithm confidences sorted first and sorted second in the updated sorting result corresponding to the same-layer pro-tocol type; performs weighted summation on the target algorithm confidences sorted first and sorted second corre-sponding to the same-layer protocol type, to obtain a first updated confidence corresponding to each layer protocol type, and performs by analogy, until the target algorithm confidences corresponding to the same-layer protocol type each participate in the calculation; and obtains a final calculation result corresponding to each layer protocol type as the second confidence corresponding to each layer pro-tocol type. The detection server obtains the intermediate confidence corresponding to each layer protocol type by multiplying the target protocol confidence corresponding to the same-layer protocol type by the second confidence corresponding to the same-layer protocol type. Weighted summation may be performed on the intermediate confi-dences to obtain the target confidence, or the intermediate confidences may also be respectively used as the target confidence.

In an embodiment, the obtaining a first confidence cor-responding to each layer protocol type according to target algorithm confidences sorted first and sorted second in the sorting result corresponding to the same-layer protocol type includes: obtaining merge weights corresponding to the target algorithm confidence currently sorted first and the target algorithm confidence currently sorted second, where the merge weight corresponding to the target algorithm confidence currently sorted second is determined based on the target algorithm confidence currently sorted first; and merging the target algorithm confidences sorted first and sorted second in the sorting result corresponding to the same-layer protocol type based on a merge weight corresponding to the same-layer protocol type, to obtain the first confidence corresponding to each layer protocol type.

Specifically, when the first confidence is calculated, the merge weight corresponding to the target algorithm confidence sorted second may be determined based on the target algorithm confidence sorted first in the sorting result corresponding to the same-layer protocol type. For example, a difference between the target algorithm confidence currently sorted first and a preset algorithm confidence is used as the merge weight corresponding to the target algorithm confidence currently sorted second. The preset algorithm confidence may be set according to needs, such as, be set to 1. When the first confidence is calculated, the merge weight corresponding to the target algorithm confidence sorted first in the sorting result corresponding to the same-layer protocol type may be a preset weight, and the preset weight may be set according to needs, such as, be set to 1. After the merge weights corresponding to the target algorithm confidences sorted first and sorted second in the sorting result corresponding to the same-layer protocol type are obtained, the detection server may merge the target algorithm confidences sorted first and sorted second in the sorting result corresponding to the same-layer protocol type based on the merge weight corresponding to the same-layer protocol type, to obtain the first confidence corresponding to each layer protocol type.

In an embodiment, a protocol confidence may be represented as $score_{pro}(pro_i)=M_i$, where $score_{pro}$ represents the protocol confidence, $pro_i$ represents a protocol type i, and $M_i$ represents the protocol confidence corresponding to the protocol type i. A value range of $M_i$ is [0, 1], and greater $M_i$ indicates a greater abnormality degree of a corresponding network data packet. An algorithm confidence may be represented as $score_{alg}*(<pro_i, alg_j>)=N_k$, where $score_{alg}$ represents the algorithm confidence, $<pro_i, alg_j>$ represents a fingerprint generation algorithm j under the protocol type i, and $N_k$ represents the algorithm confidence corresponding to the fingerprint generation algorithm j under the protocol type i. A value range of $N_k$ is [0, 1], and greater $N_k$ indicates a greater abnormality degree of a corresponding network data packet.

Figure 7:
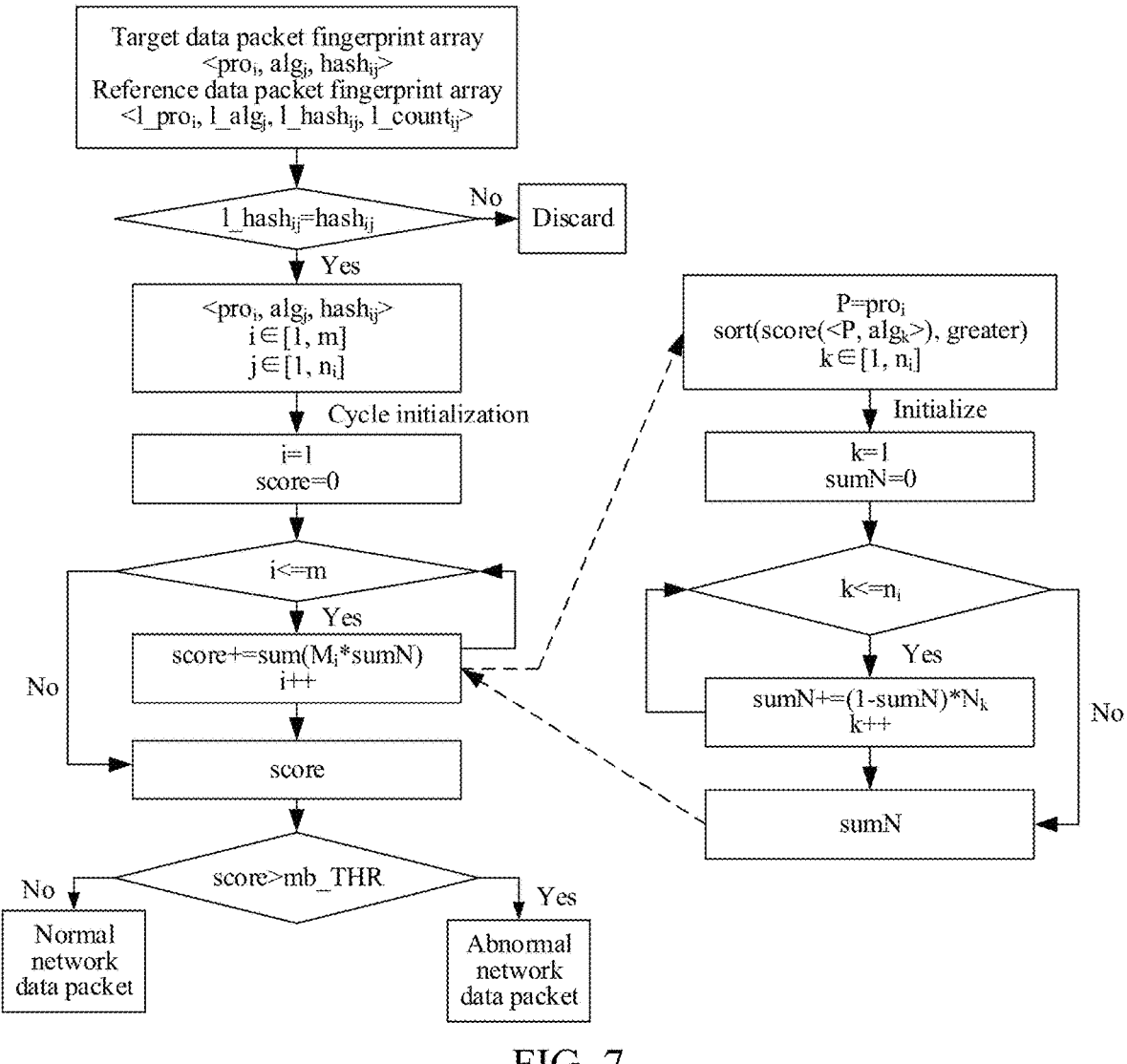
FIG. 7 is a schematic flowchart of determining an abnormality detection result of a to-be-detected network data packet according to an embodiment.

Referring to FIG. 7, $<pro_i, alg_j, hash_{ij}>$ represents a target data packet fingerprint array, and $<l\_pro_i, l\_alg_j, l\_hash_{ij}, l\_count_{ij}>$ represents a reference data packet fingerprint array. $pro_i$ represents a protocol type i corresponding to a target data packet fingerprint, alga represents a fingerprint generation algorithm j corresponding to the target data packet fingerprint, $hash_{ij}$ represents the target data packet fingerprint generated based on the fingerprint generation algorithm j corresponding to the protocol type i, $l\_pro_i$ represents a protocol type i corresponding to a reference data packet fingerprint, $l\_alg_j$ represents a fingerprint generation algorithm j corresponding to the reference data packet fingerprint, $l\_hash_{ij}$ represents the reference data packet fingerprint generated based on the fingerprint generation algorithm j corresponding to the protocol type i, and l_coun- $t_{ij}$ represents a statistical value corresponding to the reference data packet fingerprint. Successfully matched target data packet fingerprints may be determined according to a comparison result of $l\_hash_{ij}$ and $hash_{ij}$, and then intermediate confidences of protocol types corresponding to the successfully matched target data packet fingerprints are cyclically accumulated, to obtain a target confidence score corresponding to the to-be-detected network data packet. The target confidence score+=sum($M_i$*sumN), i++. When the target confidence score exceeds a reference confidence mb_THR, it is considered that the to-be-detected network data packet is an abnormal network data packet; otherwise, it is considered that the to-be-detected network data packet is a normal network data packet. When the to-be-detected network data packet is the abnormal network data packet, alarm information may be transmitted to operation and maintenance personnel, and the to-be-detected network data packet may also be blocked. When the target confidence score is generated, the target algorithm confidences corresponding to the same-layer protocol type are reversely sorted in the descending order, that is, sort(score($<P, alg_k>$), greater), and then the target algorithm confidences are accumulated according to an accumulation formula. The accumulation formula is sumN+=(1−sumN)*$N_k$, k++. The accumulation formula can ensure that an algorithm confidence value accumulated under the same-layer protocol type is closer to 1 but does not exceed 1 when there are more successfully matched target data packet fingerprints, and can ensure that the algorithm confidence value accumulated under the same-layer protocol type is greater than a maximum target algorithm confidence.

For example, $score_{pro}$(http)=0.9, $score_{alg}$(<http, fatt>)=0.8, $score_{alg}$(<http, pmercury>)=0.6, and mb_THR=0.7. mb_THR represents the reference confidence.

If one target data packet fingerprint in the to-be-detected network data packet matches a reference data packet fingerprint generated based on the fingerprint generation algorithm fatt corresponding to the HTTP in the reference data packet fingerprint library, and another target data packet fingerprint matches a reference data packet fingerprint generated based on the fingerprint generation algorithm pmercury corresponding to the HTTP in the reference data packet fingerprint library, the target confidence score corresponding to the to-be-detected network data packet=0.9*[0.8±(1−0.8)*0.6]=0.828>0.7. Therefore, it is determined that the to-be-detected network data packet is the abnormal network data packet. It may be understood that, because the target data packet fingerprint of the to-be-detected network data packet does not match a reference data packet fingerprint generated based on the TCP in the reference data packet fingerprint library, there is no need to calculate an intermediate confidence corresponding to the TCP, and an intermediate confidence corresponding to the HTTP is directly used as the target confidence corresponding to the to-be-detected network data packet.

In an embodiment, the determining an abnormality detection result of the to-be-detected network data packet based on the reference confidence and the target confidence includes: determining, in a case that the target confidence is greater than the reference confidence, that the abnormality detection result is that the network data packet is abnormal; and determining, in a case that the target confidence is less than or equal to the reference confidence, that the abnormality detection result is that the network data packet is normal.

Specifically, the reference confidence may be a comprehensive confidence threshold. Alternatively, one protocol type may correspond to one confidence threshold, that is, there are a plurality of reference confidences. When the target confidence is greater than the reference confidence, it is determined that the abnormality detection result is that the network data packet is abnormal. When the target confidence is less than or equal to the reference confidence, it is determined that the abnormality detection result is that the network data packet is normal. Confidence thresholds corresponding to different protocol types may be the same or different. For example, a confidence threshold corresponding to the HTTP may be 0.7, and a confidence threshold corresponding to the TCP may be 0.65.

In this embodiment, by comparing a target confidence and a reference confidence, an abnormality detection result of a to-be-detected network data packet can be rapidly determined.

In an embodiment, the method further includes: obtaining a blocking data packet in a case that the abnormality detection result is that the network data packet is abnormal; and transmitting the blocking data packet to a receiving party corresponding to the to-be-detected network data packet, to cause the receiving party to stop establishing a communication connection with a transmitting party corresponding to the to-be-detected network data packet.

Specifically, when the abnormality detection result of the to-be-detected network data packet is that the network data packet is abnormal, the detection server may obtain the blocking data packet, and transmit the blocking data packet to the receiving party corresponding to the to-be-detected network data packet. The detection server may obtain related information of the transmitting party from the to-be-detected network data packet, and carry the related information of the transmitting party into the blocking data packet. Therefore, after receiving the blocking data packet, the receiving party may actively stop establishing the communication connection with the transmitting party, so as to block the to-be-detected network data packet.

In an embodiment, the blocking data packet may be a reset (RST) packet. The RST packet is used for disconnecting a communication connection between two communication parties.

In this embodiment, when an abnormality detection result of a to-be-detected network data packet is that the network data packet is abnormal, a blocking data packet is transmitted to a receiving party corresponding to the to-be-detected network data packet, so that a communication connection between a transmitting party and the receiving party corresponding to the to-be-detected network data packet can be rapidly disconnected, thereby effectively preventing a hacker from attacking.

In an embodiment, the method further includes: periodically counting matching success rates corresponding to the reference data packet fingerprints; and filtering out reference data packet fingerprints whose matching success rates are less than a preset threshold from the reference data packet fingerprint library.

Specifically, to improve the space utilization of the reference data packet fingerprint library, the reference data packet fingerprints in the reference data packet fingerprint library may be periodically filtered, so that reference data packet fingerprints that have not matched for a long time are filtered out. It may be understood that, if a reference data packet fingerprint does not successfully match for a long time, it may be considered that attacks of a hacker corresponding to the reference data packet fingerprint have been stopped. Because the reference data packet fingerprint library is constantly expanded, the reference data packet fingerprints that have not matched for the long time can be filtered out, so as to improve the space utilization of the reference data packet fingerprint library. The detection server may periodically count the matching success rates corresponding to the reference data packet fingerprints in the reference data packet fingerprint library, and filter out the reference data packet fingerprints whose matching success rates are less than the preset threshold from the reference data packet fingerprint library. The detection server may specifically obtain the matching success rates corresponding to the reference data packet fingerprints according to matching success numbers of the reference data packet fingerprints and storage times of the reference data packet fingerprints in the reference data packet fingerprint library. Different storage times correspond to different reference matching numbers, and ratios of the matching success numbers to the reference matching numbers are used as the matching success rates. The preset threshold may be set according to actual needs.

This disclosure further provides an application scenario, and the above method for detecting abnormal network data is applied to the application scenario. Specifically, the application of the method for detecting abnormal network data in the application scenario is as follows:

The method for detecting abnormal network data may be used for second dialing attack detection Second dialing refers to a principle of using a domestic home broadband to dial up. A new IP is obtained every disconnection and reconnection, so that an IP jump for dialing by second is realized. A hacker can attack a computer device by using a second dialing technology, to steal core data.

Figures 8, 9:
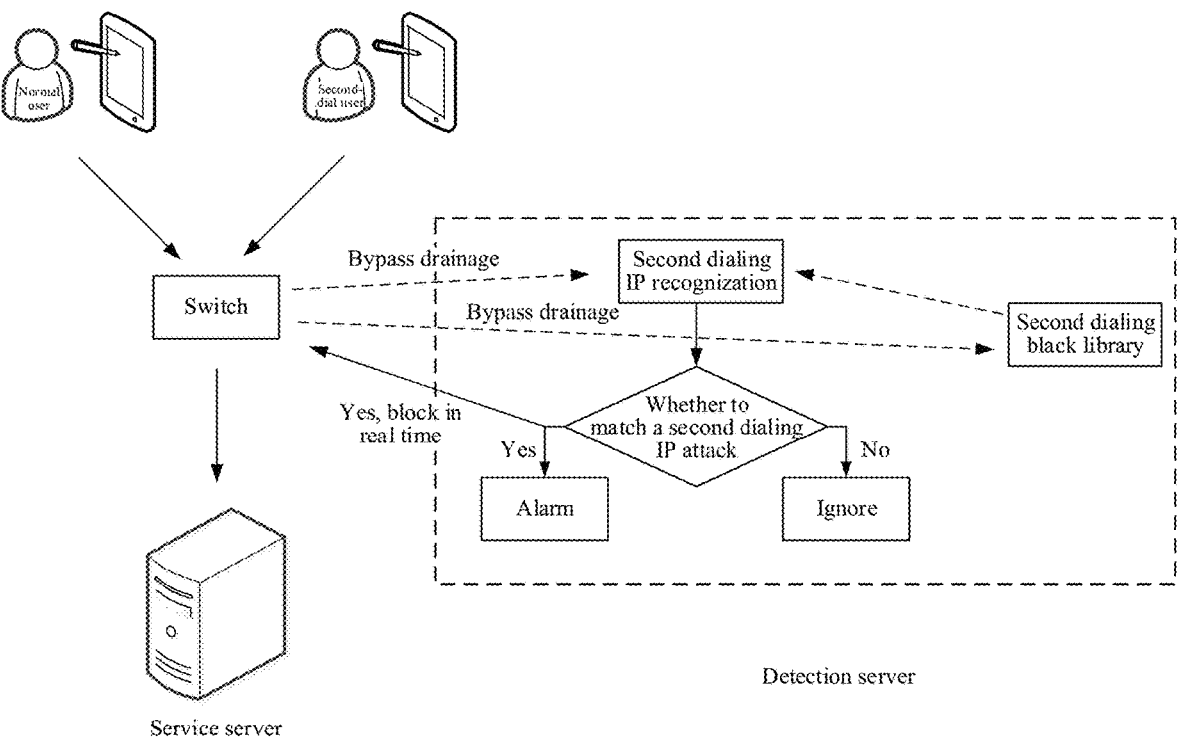
FIG. 8 is a diagram of an application environment of a method for detecting abnormal network data according to another embodiment.
FIG. 9 is a schematic flowchart of a method for detecting abnormal network data according to another embodiment.

As shown in FIG. 8, both a normal user and a second-dial user can transmit a network data packet to a service server through a terminal. The terminal may communicate with the service server through a switch. A detection server may obtain candidate network data packets in a same time window from the switch in a bypass drainage mode, generate candidate data packet fingerprint respectively corresponding to the candidate network data packets, and establish a second dialing black library according to the candidate data packet fingerprints. The detection server may obtain a target network data packet (real-time traffic) from the switch in the bypass drainage mode, generate a target data packet fingerprint corresponding to the target network data packet, match the target data packet fingerprint and a reference data packet fingerprint, calculate a target confidence corresponding to the successfully matched target data packet fingerprint, and recognize a second dialing IP according to a comparison result of the target confidence and a confidence threshold. When the target confidence is greater than the confidence threshold, it is determined that the target network data packet is an abnormal network data packet, and a second dialing IP attack is matched, thereby performing an alarm, and blocking the abnormal network data packet in real time. When the target confidence is less than or equal to the confidence threshold, it is determined that the target network data packet is a normal network data packet.

As shown in FIG. 9, a specific process in which the detection server recognizes the second dialing attack is as follows:

1. Establish a second dialing black library.

1-1. Acquire a plurality of candidate network data packets in a same time window from a switch (that is, count traffic in the time window).

1-2. Generate at least one candidate data packet fingerprint respectively corresponding to the candidate network data packets, and obtain a candidate data packet fingerprint set by combining the candidate data packet fingerprints.

Specifically, a current-layer protocol type and a related-layer protocol type corresponding to each of the candidate network data packets are obtained; a matched feature field is obtained from the candidate network data packet based on at least one fingerprint generation algorithm corresponding to the current-layer protocol type, and a corresponding candidate data packet fingerprint is generated according to the feature field; a matched feature field is obtained from the candidate network data packet based on at least one fingerprint generation algorithm corresponding to the related-layer protocol type, and a corresponding candidate data packet fingerprint is generated according to the feature field; and the candidate data packet fingerprint set is obtained by combining the plurality of candidate data packet fingerprints corresponding to the candidate network data packets.

For example, a current-layer protocol type corresponding to an HTTP network data packet is an HTTP, a corresponding related-layer protocol type is a TCP, fingerprint generation algorithms corresponding to the HTTP include fatt and pmercury, and a fingerprint generation algorithm corresponding to the TCP includes pmercury. A matched feature field is obtained from a candidate network data packet based on the fingerprint generation algorithm fatt corresponding to the HTTP, and a corresponding candidate data packet fingerprint hash1 is generated according to the feature field. A matched feature field is obtained from the candidate network data packet based on the fingerprint generation algorithm pmercury corresponding to the HTTP, and a corresponding candidate data packet fingerprint hash2 is generated according to the feature field. A matched feature field is obtained from the candidate network data packet based on the fingerprint generation algorithm pmercury corresponding to the TCP, and a corresponding candidate data packet fingerprint hash3 is generated according to the feature field. The candidate data packet fingerprints corresponding to the HTTP network data packet include the candidate data packet fingerprint hash1, the candidate data packet fingerprint hash2, and the candidate data packet fingerprint hash3.

1-3. Cluster the candidate data packet fingerprints, and establish the second dialing black library according to a clustering result.

Specifically, same candidate data packet fingerprints generated based on a same fingerprint generation algorithm corresponding to a same protocol type are clustered to obtain a plurality of different clusters, and a quantity of candidate data packet fingerprints in a same cluster is counted, to obtain statistical values corresponding to clusters. Candidate data packet fingerprints of clusters whose statistical values are greater than a statistical threshold are used as the reference data packet fingerprints, and the second dialing black library (namely, a reference data packet fingerprint library) is obtained by combining the reference data packet fingerprints.

For example, assuming that the statistical threshold is 50, if a total quantity of candidate data packet fingerprints hash1 generated based on the fingerprint generation algorithm fatt corresponding to the HTTP in the candidate data packet fingerprint library is 55 and is greater than 50, the candidate data packet fingerprints hash1 may be added to the second dialing black library as the reference data packet fingerprints. The second dialing black library may store the candidate data packet fingerprints hash1 according to such an array of <HTTP, fingerprint generation algorithm fatt, hash1, 55>.

2. Acquire real-time traffic from a switch, and perform second dialing attack detection on the real-time traffic based on the second dialing black library.

2-1. Generate at least one target data packet fingerprint corresponding to a to-be-detected network data packet (namely, the real-time traffic), and obtain a target data packet fingerprint set by combining the target data packet fingerprints.

Specifically, a current-layer protocol type and a related-layer protocol type corresponding to the to-be-detected network data packet (namely, the real-time traffic) are obtained. A matched feature field is obtained from the to-be-detected network data packet based on at least one fingerprint generation algorithm corresponding to the current-layer protocol type, and a corresponding target data packet fingerprint is generated according to the feature field. A matched feature field is obtained from the to-be-detected network data packet based on at least one fingerprint generation algorithm corresponding to the related-layer protocol type, and a corresponding target data packet fingerprint is generated according to the feature field. The target data packet fingerprint set corresponding to the to-be-detected network data packet is obtained by combining the target data packet fingerprints.

2-2. Match the target data packet fingerprint and a reference data packet fingerprint in the second dialing black library.

Specifically, the target data packet fingerprint and the reference data packet fingerprint in the second dialing black library are matched. When the target data packet fingerprint is consistent with the reference data packet fingerprint, a protocol type corresponding to the target data packet fingerprint is consistent with a protocol type corresponding to the reference data packet fingerprint. When a fingerprint generation algorithm corresponding to the target data packet fingerprint is consistent with a fingerprint generation algorithm corresponding to the reference data packet fingerprint, it is determined that the target data packet fingerprint successfully matches the reference data packet fingerprint.

2-3. Calculate a target confidence corresponding to the to-be-detected network data packet based on the successfully matched target data packet fingerprints.

Specifically, corresponding target algorithm confidences are obtained based on the fingerprint generation algorithms corresponding to the successfully matched target data packet fingerprints, target algorithm confidences corresponding to a same-layer protocol type are sorted in a descending order, and the target algorithm confidences corresponding to the same-layer protocol type are accumulated according to an accumulation formula and a sorting sequence, to obtain an algorithm confidence statistical value (namely, a second confidence) corresponding to each layer protocol type. An intermediate confidence corresponding to each layer protocol type is obtained by multiplying a target protocol confidence corresponding to the same-layer protocol type by the algorithm confidence statistical value corresponding to the same-layer protocol type, and the target confidence is obtained by adding the intermediate confidences.

2-4. Obtain a reference confidence, and determine whether there is a second dialing attack according to a comparison result of the target confidence and the reference confidence.

Specifically, the corresponding reference confidence (namely, a confidence threshold) is obtained. When the target confidence is greater than the reference confidence, it is determined that an abnormality detection result of the to-be-detected network data packet is that the network data packet is abnormal. When the target confidence is less than or equal to the reference confidence, it is determined that the abnormality detection result of the to-be-detected network data packet is that the network data packet is normal. When the abnormality detection result of the to-be-detected network data packet is that the network data packet is abnormal, it is determined that there is the second dialing attack, and the detection server may transmit alarm information to a terminal corresponding to operation and maintenance personnel, or directly block the to-be-detected network data packet.

For example, $score_{pro}(http)=0.9$, $score_{alg}(<http, fatt>)=0.8$, $score_{alg}(<http, pmercury>)=0.6$, and $mb\_THR(http)=0.7$. $score_{pro}(tcp)=0.7$, $score_{alg}(<tcp, pmercury>)=0.7$, and $mb\_THR(tcp)=0.45$.

If one target data packet fingerprint in the to-be-detected network data packet matches a reference data packet fingerprint generated based on the fingerprint generation algorithm fatt corresponding to the HTTP in the reference data packet fingerprint library, another target data packet fingerprint matches a reference data packet fingerprint generated based on the fingerprint generation algorithm pmercury corresponding to the HTTP in the reference data packet fingerprint library, and another target data packet fingerprint matches a reference data packet fingerprint generated based on the fingerprint generation algorithm pmercury corresponding to the HTTP in the reference data packet fingerprint library, $score(http)=0.9*[0.8+(1-0.8)*0.6]=0.828>0.7$, and $score(tcp)=0.7*0.7=0.49>0.45$. Therefore, it is determined that the to-be-detected network data packet is an abnormal network data packet.

In the above method for detecting abnormal network data, the dependence of conventional detection methods on IPs is avoided, and request content, a client and even an attacker are focused on, that is, feature information of network data packets is focused on, so that the misjudgment rate of a second dialing attack can be reduced, and the detection accuracy of the second dialing attack can be improved. In addition, a data packet fingerprint set corresponding to a same network data packet includes data packet fingerprints corresponding to a plurality of protocol types and a plurality of fingerprint generation algorithms, which enriches the data packet fingerprints and can cover more attack types, so that the detection accuracy of the second dialing attack can be further improved.

It is to be understood that, although the steps in the flowcharts of FIG. 2, FIG. 4, FIG. 5, and FIG. 6 are sequentially displayed according to indication of arrows, the steps are not necessarily sequentially performed in the sequence indicated by the arrows. Unless otherwise explicitly specified in this specification, execution of the steps is not strictly limited, and the steps may be performed in other sequences. In addition, at least some steps in FIG. 2, FIG. 4, FIG. 5, and FIG. 6 may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 10:
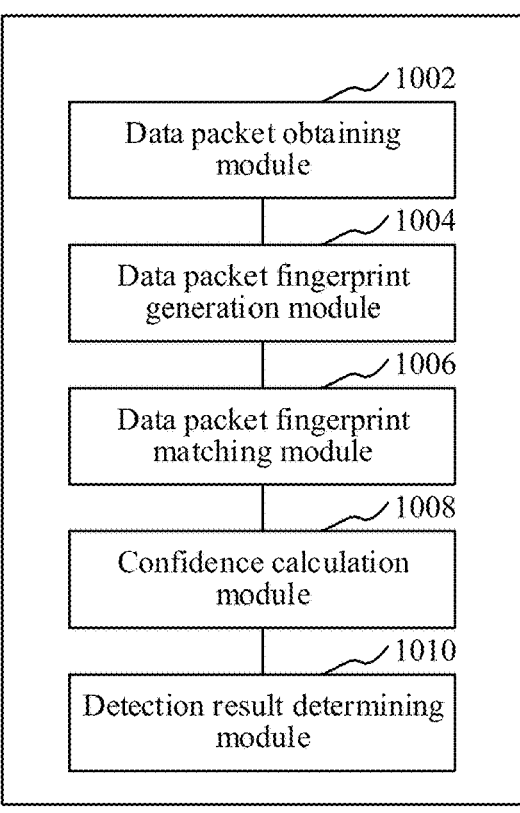
FIG. 10 is a structural block diagram of an apparatus for detecting abnormal network data according to an embodiment.

In an embodiment, as shown in FIG. 10, an apparatus for detecting abnormal network data is provided. The apparatus may use software modules or hardware modules, or become a part of a computer device by a combination of the two. The apparatus specifically includes: a data packet obtaining module 1002, a data packet fingerprint generation module 1004, a data packet fingerprint matching module 1006, a confidence calculation module 1008, and a detection result determining module 1010.

The data packet obtaining module 1002 is configured to obtain a to-be-detected network data packet.

a data packet fingerprint generation module 1004, configured to perform feature extraction on the to-be-detected network data packet according to a target protocol type corresponding to the to-be-detected network data packet, and generate a corresponding target data packet fingerprint set, the target data packet fingerprint set including at least one target data packet fingerprint;

a data packet fingerprint matching module 1006, configured to match the target data packet fingerprint and a reference data packet fingerprint in a reference data packet fingerprint library;

a confidence calculation module 1008, configured to calculate a target confidence corresponding to the to-be-detected network data packet based on confidence correlation information corresponding to the successfully matched target data packet fingerprint; and a detection result determining module 1010, configured to obtain a reference confidence, and determine an abnormality detection result of the to-be-detected network data packet based on the reference confidence and the target confidence.

Figure 11:
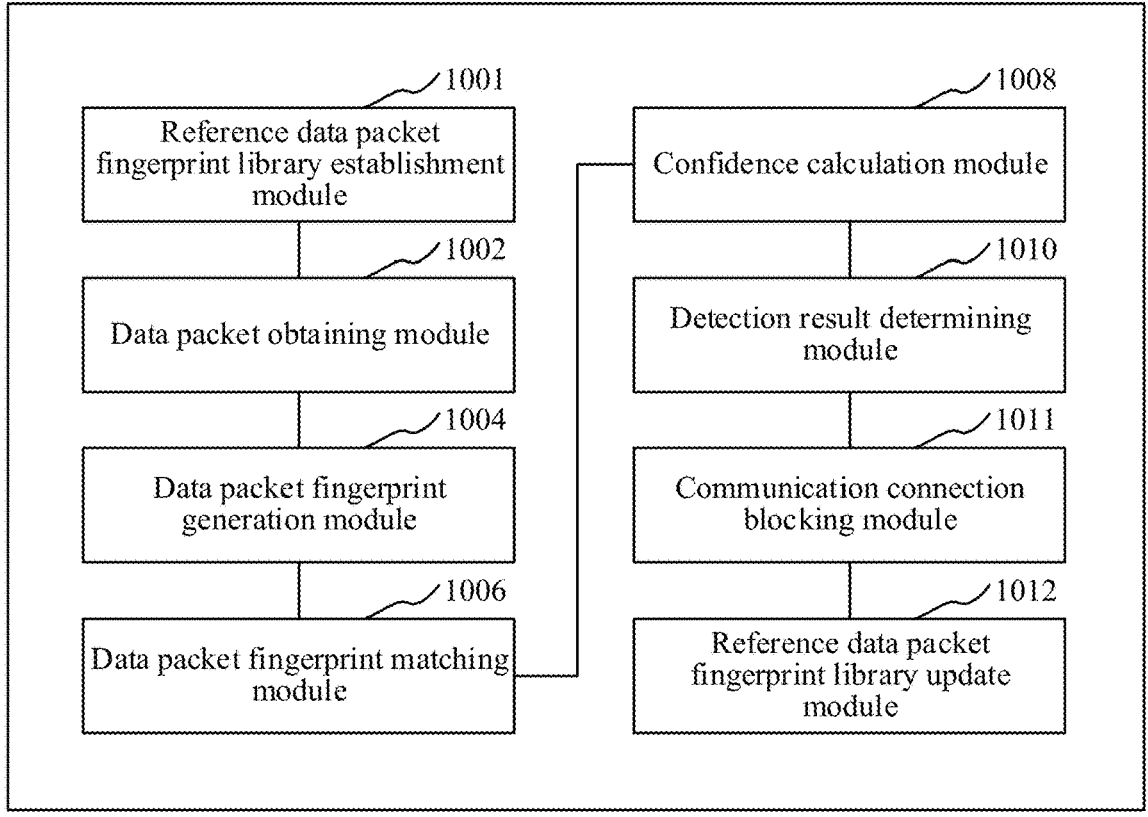
FIG. 11 is a structural block diagram of an apparatus for detecting abnormal network data according to another embodiment.

In an embodiment, as shown in FIG. 11, the apparatus further includes:

a reference data packet fingerprint library establishment module 1001, configured to obtain a candidate network data packet set, where the candidate network data packet set includes a plurality of candidate network data packets in a same time window; perform feature extraction on the candidate network data packets according to candidate protocol types corresponding to the candidate network data packets, and generate a corresponding candidate data packet fingerprint set, where the candidate data packet fingerprint set includes candidate data packet fingerprints corresponding to the candidate network data packets; cluster the candidate data packet fingerprints in the candidate data packet fingerprint set based on fingerprint correlation information, to obtain a clustering result; and determine reference data packet fingerprints from the candidate data packet fingerprint set according to the clustering result, and obtain the reference data packet fingerprint library by combining the reference data packet fingerprints.

In an embodiment, the current network data packet is the to-be-detected network data packet, and the data packet fingerprint generation module is further configured to obtain a current protocol type corresponding to the current network data packet, where the current protocol type includes a current-layer protocol type and a related-layer protocol type; obtain at least one fingerprint generation algorithm corresponding to the current protocol type; extract a matched feature field from the current network data packet based on the fingerprint generation algorithm, and obtain current data packet fingerprints generated by the fingerprint generation algorithms corresponding to the current protocol type according to the feature field; and obtain the data packet fingerprint set corresponding to the current network data packet by combining the current data packet fingerprints.

In an embodiment, the current network data packet is a candidate network data packet, and the reference data packet fingerprint library establishment module is further configured to obtain a current protocol type corresponding to the current network data packet, where the current protocol type includes a current-layer protocol type and a related-layer protocol type; obtain at least one fingerprint generation algorithm corresponding to the current protocol type; extract a matched feature field from the current network data packet based on the fingerprint generation algorithm, and obtain current data packet fingerprints generated by the fingerprint generation algorithms corresponding to the current protocol type according to the feature field; and obtain the data packet fingerprint set corresponding to the current network data packet by combining the current data packet fingerprints.

In an embodiment, the fingerprint correlation information includes the candidate protocol types corresponding to the candidate data packet fingerprints and fingerprint generation algorithms, and the reference data packet fingerprint library establishment module is further configured to cluster same candidate data packet fingerprints generated based on a same fingerprint generation algorithm corresponding to a same protocol type, to obtain a plurality of different clusters, and count a quantity of candidate data packet fingerprints in a same cluster, to obtain statistical values corresponding to the clusters; and the reference data packet fingerprint library establishment module is further configured to use candidate data packet fingerprints of clusters whose statistical values are greater than a statistical threshold as the reference data packet fingerprints.

In an embodiment, the data packet fingerprint matching module is further configured to compare the target data packet fingerprint and a current reference data packet fingerprint, to obtain a data packet fingerprint comparison result; compare fingerprint correlation information corresponding to the target data packet fingerprint and fingerprint correlation information corresponding to the current reference data packet fingerprint, to obtain a fingerprint correlation information comparison result; and determine, in a case that the data packet fingerprint comparison result is consistent with the fingerprint correlation information comparison result, that the target data packet fingerprint successfully matches the current reference data packet fingerprint.

In an embodiment, the confidence calculation module is further configured to obtain a target protocol confidence corresponding to the target protocol type; obtain a corresponding target algorithm confidence based on a fingerprint generation algorithm corresponding to the successfully matched target data packet fingerprint; and obtain the target confidence based on the target protocol confidence and the target algorithm confidence.

In an embodiment, the target protocol type includes a current-layer protocol type and a related-layer protocol type, and the confidence calculation module is further configured to sort target algorithm confidences corresponding to a same-layer protocol type in a descending order, to obtain a sorting result corresponding to each layer protocol type; obtain a first confidence corresponding to each layer protocol type according to target algorithm confidences sorted first and sorted second in the sorting result corresponding to the same-layer protocol type; sort remaining target algorithm confidences in the sorting result corresponding to the same-layer protocol type and the first confidence corresponding to the same-layer protocol type in the descending order, to obtain an updated sorting result corresponding to each layer protocol type; return to the operation of obtaining a first confidence corresponding to each layer protocol type according to target algorithm confidences sorted first and sorted second in the sorting result corresponding to the same-layer protocol type, until the target algorithm confidences corresponding to the same-layer protocol type each participate in data processing; and obtain a second confidence corresponding to each layer protocol type; and obtain an intermediate confidence corresponding to each layer protocol type based on the target protocol confidence and the second confidence corresponding to the same-layer protocol type, and obtain the target confidence according to the intermediate confidences.

In an embodiment, the confidence calculation module is further configured to obtain merge weights corresponding to the target algorithm confidence currently sorted first and the target algorithm confidence currently sorted second, where the merge weight corresponding to the target algorithm confidence currently sorted second is determined based on the target algorithm confidence currently sorted first; and merge the target algorithm confidences sorted first and sorted second in the sorting result corresponding to the same-layer protocol type based on a merge weight corresponding to the same-layer protocol type, to obtain the first confidence corresponding to each layer protocol type.

In an embodiment, the detection result determining module is further configured to determine, in a case that the target confidence is greater than the reference confidence, that the abnormality detection result is that the network data packet is abnormal; and determine, in a case that the target confidence is less than or equal to the reference confidence, that the abnormality detection result is that the network data packet is normal.

In an embodiment, as shown in FIG. 11, the apparatus further includes:

a communication connection blocking module 1011, configured to obtain a blocking data packet in a case that the abnormality detection result is that the network data packet is abnormal; and transmit the blocking data packet to a receiving party corresponding to the to-be-detected network data packet, to cause the receiving party to stop establishing a communication connection with a transmitting party corresponding to the to-be-detected network data packet.

In an embodiment, as shown in FIG. 11, the apparatus further includes:

a reference data packet fingerprint library update module 1012, configured to periodically count matching success rates corresponding to the reference data packet fingerprints; and filter out reference data packet fingerprints whose matching success rates are less than a preset threshold from the reference data packet fingerprint library.

In the above apparatus for detecting abnormal network data, the generated target data packet fingerprint can represent feature information of the to-be-detected network data packet, and a plurality of target data packet fingerprints can represent the feature information of the to-be-detected network data packet from different dimensions, thereby enriching the detection dimensions of an abnormal network data packet, and improving the detection accuracy of the abnormal network data packet. Further, the reference data packet fingerprint library integrates a plurality of abnormal reference data packet fingerprints. Therefore, the successfully matched target data packet fingerprint can represent feature information that the to-be-detected network data packet is abnormal, the target confidence calculated based on the confidence correlation information corresponding to the successfully matched target data packet fingerprint can represent an abnormality degree of the to-be-detected network data packet, and the abnormality detection result of the to-be-detected network data packet can be rapidly determined based on the reference confidence and the target confidence, thereby improving the detection accuracy and the detection efficiency of the abnormal network data packet.

For a specific limitation on the apparatus for detecting abnormal network data, refer to the limitation on the method for detecting abnormal network data above. Details are not described herein again. The modules in the apparatus for detecting abnormal network data may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 12. The computer device includes a processor (including processing circuitry), a memory (including a non-transitory computer-readable storage medium), and a network interface connected through a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store data such as reference data packet fingerprints, protocol confidences, algorithm confidences, and fingerprint generation algorithms. The network interface of the computer device is configured to communicate with an external terminal through a network connection. The computer-readable instruction is executed by the processor to implement a method for detecting abnormal network data.

Figure 12:
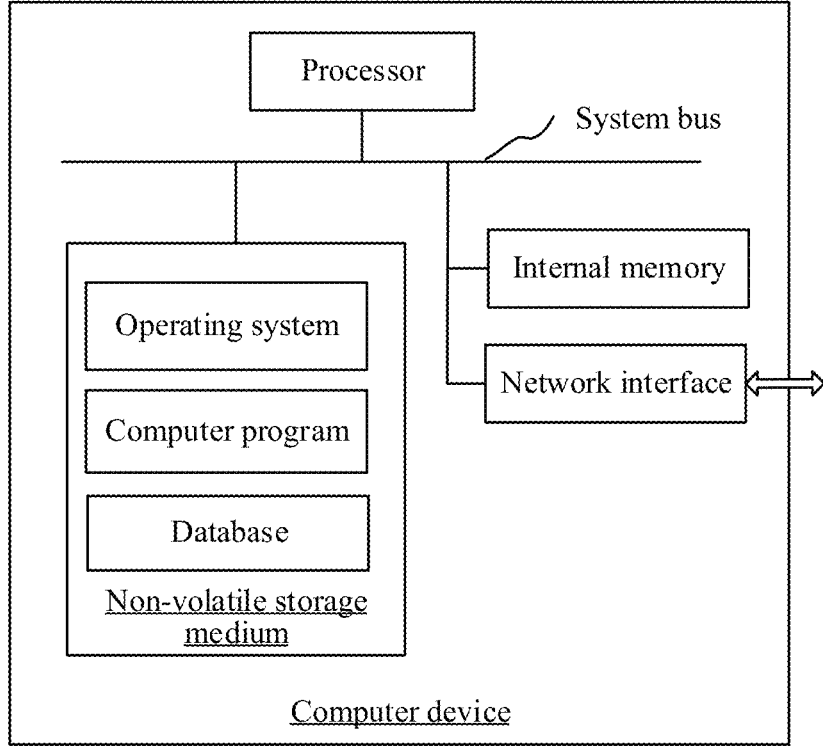
FIG. 12 is a diagram of an internal structure of a computer device according to an embodiment.

A person skilled in the art may understand that, the structure shown in FIG. 12 is only a block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In an embodiment, a computer device is provided, including: a memory and one or more processors, the memory storing computer-readable instructions, the one or more processors, when executing the computer-readable instructions, implementing the steps in the foregoing method embodiments.

In an embodiment, one or more computer-readable storage media are provided, storing computer-readable instructions, the computer-readable instructions, when executed by one or more processors, causing the one or more processors to implement the steps in the foregoing method embodiments.

In an embodiment, a computer program product or a computer program is provided. The computer program product or computer program includes computer-readable instructions, the computer-readable instructions being stored in a computer-readable storage medium. A processor of a computer device reads the computer-readable instructions from the computer-readable storage medium, and the processor executes the computer-readable instructions, to cause the computer device to perform the steps in the above method embodiments.

A person of ordinary skill in the art may understand that some or all procedures in the foregoing method embodiments may be implemented by a computer-readable instruction instructing related hardware. The computer-readable instruction may be stored in a non-volatile computer-readable storage medium, and when the computer-readable instruction is executed, the procedures of the foregoing method embodiments may be performed. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined. To make description concise, not all possible combinations of the technical features in the foregoing embodiments are described. However, the combinations of these technical features shall be considered as falling within the scope recorded by this specification provided that no conflict exists.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for detecting abnormal network data, the method comprising:
    obtaining a network data packet;
    for each of two or more protocol types corresponding to the network data packet:
        extracting one or more feature fields from the network data packet based on at least one fingerprint generation algorithm that corresponds to the respective protocol type; and
        generating, according to the at least one fingerprint generation algorithm and the extracted one or more feature fields, one or more data packet fingerprints;
    obtaining a data packet fingerprint set corresponding to the network data packet that includes the data packet fingerprints generated for the two or more protocol types;
    matching at least one data packet fingerprint in the data packet fingerprint set and a reference data packet fingerprint in a reference data packet fingerprint library;
    calculating a confidence corresponding to the network data packet based on confidence correlation information corresponding to each of the at least one matched data packet fingerprint;
    obtaining a reference confidence; and
    determining an abnormality detection result of the network data packet based on the reference confidence and the calculated confidence.

2. The method according to claim 1, wherein the method further comprises:
    before the obtaining the network data packet, obtaining a candidate network data packet set, wherein the candidate network data packet set comprises a plurality of candidate network data packets acquired within a time window;

performing feature extraction on each of the candidate network data packets according to one or more candidate protocol types corresponding to the respective candidate network data packet, and generating a corresponding candidate data packet fingerprint set, wherein the candidate data packet fingerprint set comprises candidate data packet fingerprints corresponding to respective ones of the candidate network data packets;

clustering the candidate data packet fingerprints in the candidate data packet fingerprint set based on fingerprint correlation information, to obtain plural clusters of the candidate data packet fingerprints; and identifying reference data packet fingerprints in the candidate data packet fingerprint set by selecting one or more clusters, and generating the reference data packet fingerprint library by combining the reference data packet fingerprints.

3. The method according to claim 2, wherein the fingerprint correlation information comprises a candidate protocol type and a fingerprint generation algorithm corresponding to each of the candidate data packet fingerprints, and the clustering comprises:

clustering candidate data packet fingerprints that were generated for a same protocol type, to obtain the plural clusters, and counting a quantity of candidate data packet fingerprints in a same cluster, to obtain statistical values corresponding to the clusters; and the identifying the reference data packet fingerprints comprises:

identifying candidate data packet fingerprints of clusters whose statistical values are greater than a statistical threshold as the reference data packet fingerprints.

4. The method according to claim 1, wherein the matching comprises:

comparing each of the at least one data packet fingerprint with a current reference data packet fingerprint, to obtain a data packet fingerprint comparison result;

comparing fingerprint correlation information corresponding to the respective one of the at least one data packet fingerprint with fingerprint correlation information corresponding to the current reference data packet fingerprint, to obtain a fingerprint correlation information comparison result; and determining, in response to a determination that the data packet fingerprint comparison result and the fingerprint correlation information comparison result indicate a match, that the respective one of the at least one data packet fingerprint matches the current reference data packet fingerprint.

5. The method according to claim 1, wherein the calculating comprises:

obtaining a protocol confidence corresponding to a protocol type of the at least one data packet fingerprint matched to the reference data packet fingerprint;

obtaining an algorithm confidence based on a fingerprint generation algorithm corresponding to the at least one data packet fingerprint matched to the reference data packet fingerprint; and obtaining the confidence based on the protocol confidence and the algorithm confidence.

6. The method according to claim 5, wherein the protocol types comprise an application layer protocol type and another layer protocol type, and the obtaining the confidence based on the protocol confidence and the algorithm confidence comprises:

sorting algorithm confidences corresponding to each of the protocol types in a descending order, to obtain a sorting result corresponding to each layer protocol type;

obtaining a first confidence corresponding to each layer protocol type by combining algorithm confidences sorted first and sorted second in the sorting result corresponding to the respective protocol type;

sorting remaining algorithm confidences in the sorting result corresponding to the respective protocol type and the first confidence corresponding to the respective protocol type in the descending order, to obtain an updated sorting result corresponding to each layer protocol type;

returning to obtaining the first confidence corresponding to each layer protocol type according to algorithm confidences sorted first and sorted second in the updated sorting result corresponding to the respective protocol type, until all algorithm confidences corresponding to the respective protocol type each participate in calculating the first confidence;

obtaining a second confidence corresponding to each layer protocol type; and obtaining an intermediate confidence corresponding to each layer protocol type based on the protocol confidence and the second confidence corresponding to the respective protocol type, and obtaining the confidence according to one or more of the intermediate confidences.

7. The method according to claim 6, wherein the obtaining the first confidence comprises:

obtaining merge weights corresponding to algorithm confidences currently sorted first and second, wherein a merge weight corresponding to the algorithm confidence currently sorted second is determined based on the algorithm confidence currently sorted first; and merging the algorithm confidences sorted first and sorted second in the sorting result corresponding to the respective protocol type based on the obtained merge weights, to obtain the first confidence corresponding to each layer protocol type.

8. The method according to claim 1, wherein the determining the abnormality detection result comprises:

determining, in response to a determination that the confidence is greater than the reference confidence, that the network data packet is abnormal; and determining, in response to a determination that the confidence is less than or equal to the reference confidence, that the network data packet is normal.

9. The method according to claim 1, further comprising:

when the network data packet is determined as abnormal, obtaining a blocking data packet; and transmitting the blocking data packet to a receiving party corresponding to the network data packet, to cause the receiving party to stop a communication connection with a transmitting party corresponding to the network data packet.

10. The method according to claim 1, further comprising:

monitoring matching success rates corresponding to each reference data packet fingerprint in the reference data packet fingerprint library; and filtering out reference data packet fingerprints whose matching success rates are less than a preset threshold from the reference data packet fingerprint library.

11. An apparatus for detecting abnormal network data, comprising:

processing circuitry configured to obtain a network data packet;

for each of two or more protocol types corresponding to the network data packet:

extract one or more feature fields from the network data packet based on at least one fingerprint generation algorithm that corresponds to the respective protocol type; and generate, according to the at least one fingerprint generation algorithm and the extracted one or more feature fields, one or more data packet fingerprints;

obtain a data packet fingerprint set corresponding to the network data packet that includes the data packet fingerprints generated for the two or more protocol types;

match at least one data packet fingerprint in the data packet fingerprint set and a reference data packet fingerprint in a reference data packet fingerprint library;

calculate a confidence corresponding to the network data packet based on confidence correlation information corresponding to each of the at least one matched data packet fingerprint;

obtain a reference confidence; and determine an abnormality detection result of the network data packet based on the reference confidence and the calculated confidence.

12. The apparatus according to claim 11, wherein the processing circuitry is further configured to:

obtain a candidate network data packet set, wherein the candidate network data packet set comprises a plurality of candidate network data packets acquired within a time window;

perform feature extraction on each of the candidate network data packets according to two or more candidate protocol types corresponding to the respective candidate network data packet, and generate, for each candidate network data packet, a corresponding candidate data packet fingerprint set, wherein the candidate data packet fingerprint set comprises candidate data packet fingerprints generated for the candidate network data packets;

cluster the candidate data packet fingerprints in the candidate data packet fingerprint set based on fingerprint correlation information, to obtain plural clusters of the candidate data packet fingerprints; and identify reference data packet fingerprints from the candidate data packet fingerprint set by selecting one or more clusters, and generate the reference data packet fingerprint library by combining the reference data packet fingerprints.

13. The apparatus according to claim 12, wherein the fingerprint correlation information comprises the candidate protocol type and a fingerprint generation algorithm corresponding to each of the candidate data packet fingerprints, and the processing circuitry is further configured to cluster candidate data packet fingerprints that were generated for a same protocol type corresponding to a same fingerprint generation algorithm, to obtain the plural clusters, and count a quantity of candidate data packet fingerprints in a same cluster, to obtain statistical values corresponding to the clusters; and identify candidate data packet fingerprints of clusters whose statistical values are greater than a statistical threshold as the reference data packet fingerprints.

14. The apparatus according to claim 11, wherein the processing circuitry is further configured to compare each of the at least one data packet fingerprint with a current reference data packet fingerprint, to obtain a data packet fingerprint comparison result;

compare fingerprint correlation information corresponding to the respective one of the at least one data packet fingerprint with fingerprint correlation information corresponding to the current reference data packet fingerprint, to obtain a fingerprint correlation information comparison result; and determine, in response to a determination that the data packet fingerprint comparison result and the fingerprint correlation information comparison result indicate a match, that the respective one of the at least one data packet fingerprint matches the current reference data packet fingerprint.

15. The apparatus according to claim 11, wherein the processing circuitry is further configured to obtain a protocol confidence corresponding to a protocol type of the at least one data packet fingerprint matched to the reference data packet fingerprint;

obtain an algorithm confidence based on a fingerprint generation algorithm corresponding to the at least one data packet fingerprint matched to the reference data packet fingerprint; and obtain the confidence based on the protocol confidence and the algorithm confidence.

16. The apparatus according to claim 15, wherein the protocol types comprise an application layer protocol type and another layer protocol type; and the processing circuitry is further configured to sort algorithm confidences corresponding to each of the protocol types in a descending order, to obtain a sorting result corresponding to each layer protocol type;

obtain a first confidence corresponding to each layer protocol type by combining algorithm confidences sorted first and sorted second in the sorting result corresponding to the respective protocol type;

sort remaining target algorithm confidences in the sorting result corresponding to the respective protocol type and the first confidence corresponding to the respective protocol type in the descending order, to obtain an updated sorting result corresponding to each layer protocol type;

return to obtaining the first confidence corresponding to each layer protocol type according to algorithm confidences sorted first and sorted second in the updated sorting result corresponding to the respective protocol type, until all algorithm confidences corresponding to the respective protocol type each participate in calculating the first confidence;

obtain a second confidence corresponding to each layer protocol type; and obtain an intermediate confidence corresponding to each layer protocol type based on the protocol confidence and the second confidence corresponding to the respective protocol type, and obtain the confidence according to the intermediate confidences.

17. The apparatus according to claim 16, wherein the processing circuitry is further configured to obtain merge weights corresponding to the algorithm confidences currently sorted first and second, wherein a merge weight corresponding to the algorithm confidence currently sorted second is determined based on the algorithm confidence currently sorted first; and merge the algorithm confidences sorted first and sorted second in the sorting result corresponding to the respective protocol type based on the obtained merge weights, to obtain the first confidence corresponding to each layer protocol type.

18. The apparatus according to claim 11, wherein the processing circuitry is further configured to:

determine, in response to a determination that the confidence is greater than the reference confidence, that the network data packet is abnormal; and determine, in response to a determination that the confidence is less than or equal to the reference confidence, that the network data packet is normal.

19. A non-transitory computer-readable storage medium storing computer-readable instructions thereon, which, when executed by a computer device, cause the computer device to perform a method for detecting abnormal network data, the method comprising:

obtaining a network data packet;

for each of two or more protocol types corresponding to the network data packet:

extracting one or more feature fields from the network data packet based on at least one fingerprint generation algorithm that corresponds to the respective protocol type; and generating, according to the at least one fingerprint generation algorithm and the extracted one or more feature fields, one or more data packet fingerprints;

obtaining a data packet fingerprint set corresponding to the network data packet that includes the data packet fingerprints generated for the two or more protocol types;

matching at least one data packet fingerprint in the data packet fingerprint set and a reference data packet fingerprint in a reference data packet fingerprint library;

calculating a confidence corresponding to the network data packet based on confidence correlation information corresponding to each of the at least one matched data packet fingerprint;

obtaining a reference confidence; and determining an abnormality detection result of the network data packet based on the reference confidence and the calculated confidence.

\* \* \* \* \*